US008229480B2

(12) United States Patent
Bantukul

(10) Patent No.: US 8,229,480 B2
(45) Date of Patent: Jul. 24, 2012

(54) METHODS, SYSTEMS, AND COMPUTER PROGRAM PRODUCTS FOR TRANSFERRING A MESSAGE SERVICE PAYLOAD BETWEEN MESSAGING ENTITIES

(75) Inventor: Apirux Bantukul, Cary, NC (US)

(73) Assignee: Tekelec, Inc., Morrisville, NC (US)

( * ) Notice: Subject to any disclaimer, the term of this patent is extended or adjusted under 35 U.S.C. 154(b) by 1376 days.

(21) Appl. No.: 11/788,762

(22) Filed: Apr. 20, 2007

(65) Prior Publication Data

US 2007/0249379 A1     Oct. 25, 2007

Related U.S. Application Data

(60) Provisional application No. 60/793,453, filed on Apr. 20, 2006.

(51) Int. Cl.
*H04W 4/00*     (2009.01)
(52) U.S. Cl. ..................... 455/466; 370/395.6
(58) Field of Classification Search .................. 455/466; 370/328, 329
See application file for complete search history.

(56) References Cited

U.S. PATENT DOCUMENTS

| | | | |
|---|---|---|---|
| 5,689,568 | A | 11/1997 | Laborde |
| 6,430,417 | B1 | 8/2002 | Raith et al. |
| 6,757,732 | B1 | 6/2004 | Sollee et al. |
| 2003/0026289 | A1 | 2/2003 | Mukherjee et al. |
| 2004/0082317 | A1* | 4/2004 | Graefen ...................... 455/413 |
| 2004/0082347 | A1* | 4/2004 | Alminana et al. ........... 455/466 |
| 2005/0215245 | A1* | 9/2005 | Tian et al. ................ 455/422.1 |
| 2006/0258394 | A1* | 11/2006 | Dhillon et al. ............. 455/552.1 |

FOREIGN PATENT DOCUMENTS

EP     2 014 108     1/2009

OTHER PUBLICATIONS

"Short Message Service (SMS) for Wideband Spread Spectrum Systems," 3rd Generation Partnership Project 2, 3GPP2 C.S0015-A Version 2.0 (Sep. 30, 2005).
Kim et al., "Interactive Services Using SMS in the CDMA Network," Pacific Telecommunications Council Proceedings (1999).
Notification of Transmittal of the International Search Report and the Written Opinion of the International Searching Authority, or the Declaration for International Application No. PCT/US07/09602 (Jul. 21, 2008).

\* cited by examiner

*Primary Examiner* — Kamran Afshar
*Assistant Examiner* — Sayed T Zewari
(74) *Attorney, Agent, or Firm* — Jenkins, Wilson, Taylor & Hunt, P.A.

(57) ABSTRACT

The subject matter described herein includes methods, systems, and computer program products for transferring a message service payload between messaging entities. According to one aspect, the subject matter described herein includes a method for intelligently processing a message service payload being transmitted between messaging entities. A messaging service message comprising a payload being transmitted from an N-generation messaging entity to an M-generation messaging entity is received at a core network, wherein N and M are integers. The payload is decoded to identify a service to be provided. An action is performed to facilitate the providing of the identified service.

47 Claims, 13 Drawing Sheets

METHODS, SYSTEMS, AND COMPUTER PROGRAM PRODUCTS FOR TRANSFERRING A MESSAGE SERVICE PAYLOAD BETWEEN MESSAGING ENTITIES

RELATED APPLICATIONS

This application claims the benefit of U.S. Provisional Patent Application Ser. No. 60/793,453, filed Apr. 20, 2006; the disclosure of which is incorporated herein by reference in its entirety.

TECHNICAL FIELD

The subject matter described herein relates to transmitting messages across a cellular network. More particularly, the subject matter described herein relates to methods, systems, and computer program products for transferring a message service payload between messaging entities.

BACKGROUND

Cellular networks are conventionally developed and deployed using a homogenous network architecture and resource definitions. For example, a second generation (2G) CDMA network operator may only provide cell phones or similar mobile terminals conforming to the requirements defined for CDMA devices to customers. The operator may also limit deployed radio equipment, mobile switching centers, and core network call processing and routing servers to products that adhere to the functional specifications published for CDMA networks. Similarly, a network operator offering third generation (3G) wireless service may only provide 3G cell phones or mobile terminals to their customers and may only deploy network equipment that implements the functional requirements published for 3G networks. However, either the 2G or 3G operator may find some commercial advantage in supporting a heterogeneous mobile network comprising multiple generations of terminals, network equipment, and services. For example, one service that may be desirable to provide between different generation mobile networks is messaging service, such as short messaging service. As used herein, the term "messaging service" is intended to refer to any type of service that delivers non-call media content between mobile terminals or between mobile terminals and fixed terminals. Examples of messaging service messages include SMS messages, multi media messaging service (MMS) messages, instant messages, and the like.

One problem associated with providing messaging service between different generation mobile networks is that core network elements between different generation mobile networks typically provide end-to-end delivery services without processing message payloads. For example, message service gateways that delivery message service messages between 2G and 3G networks typically provide end-to-end delivery services. However, it may be desirable to provide enhanced services to 3G terminals that are defined for short message service IS-637 payloads implemented in 2G CDMA networks. For example, one service parameter included in the IS-637 payload definition is an alert on delivery parameter, which requests that the recipient be alerted, e.g. through an audible tone or vibration of a handset, when a message has been delivered. If the message is delivered from a 2G CDMA subscriber to a 2G CDMA subscriber by a CDMA message server, the message will be delivered and the recipient will be alerted. However, when the destination subscriber is a 3G subscriber or other non-CDMA subscriber, there is no standard way for the 3G nodes in the network to know that delivery alerting is being requested because such nodes are incapable of processing the IS-637 payload.

Another problem associated with providing services, such as delivery alerting, to 3G destinations, is that there is no standard mechanism in SIP to encode requests for such services in message payloads. Thus, even if a message is being sent between 3G terminals and the source terminal requests delivery alerting, the destination terminal may not recognize the request for delivery alerting because the destination terminal does use the same payload encoding format as the source terminal. Thus, the non-standard payload encoding formats of 3G terminals prevent many services from being provided.

Another problem associated with delivering messages between different generation destinations relates to payload encoding. For example, because message centers typically do not decode or identify the payload encoding type, conventional solutions for delivering messages between different generation destinations require that the message centers convert messages into a common format, such as the short message delivery point-to-point protocol (SMDPP). For example, a message may be converted from the originating format to an SMDPP format and then to a destination format. Requiring conversion to an intermediate protocol, such as SMDPP, for service message delivery increases message center complexity and can potentially delay message delivery.

Accordingly, in light of these difficulties associated with providing message services between different generation destinations, there exists a need for methods, systems, and computer program products for transferring a message service payload between different generation destinations.

SUMMARY

The subject matter described herein includes methods, systems, and computer program products for transferring a message service payload between messaging entities. According to one aspect, the subject matter described herein includes a method for intelligently processing a message service payload being transmitted between messaging entities. A messaging service message comprising a payload being transmitted from an N-generation messaging entity to an M-generation messaging entity is received at a core network, wherein N and M are integers. The payload is decoded to identify a service to be provided. An action is performed to facilitate providing of the identified service. As used herein, the term "messaging entity" refers to any device that is capable of sending and/or receiving a message service message. For example, a messaging entity may be a mobile terminal or a computer that is capable of sending and receiving message service messages. A messaging entity may also include a machine, such as an ad server, that is capable of sending message service messages but that may not be capable of receiving message service messages.

In one implementation, N and M are equal to 3 so that a message is being transmitted between 3G messaging entities. However, the payload encoding type of the source 3G messaging entities might be different from that of the destination 3G messaging entities. In this instance, the payload encoding type of the source 3G messaging entity may be converted to a 2G encoding format, such as IS-637. In one implementation, the IS-637-encoded message may be transmitted to the destination, the destination 3G messaging entity may be configured to process the IS-637-encoded destination and provide the identified service (such as sending a message to the sender to indicate that the message was received. In an alternate implementation, the payload of the message may be converted from the encoding format of the source to IS-637. A core network element may convert the IS-637-encoded payload format to the payload encoding format of the 3G destination. The 3G destination may receive the message, decode the payload, and provide the identified service.

According to another aspect, the subject matter described herein includes a method for converting the format of a message service payload transmitted between different generation destinations. A message service payload defined according to an originating messaging entity is received at a core network. An originating payload encoding type and a destination payload encoding type are determined. It is then determined whether a difference exists between the originating payload encoding type and the destination payload encoding type. In response to detecting a difference between the originating payload encoding type and the destination payload encoding type, the payload is converted from the originating payload encoding type to the destination payload encoding type.

According to yet another aspect, the subject matter described herein includes a method for tunneling a 2G-encoded short message service payload through a SIP core network. A message including a 2G-encoded payload is received at a core network. The 2G-encoded payload is encapsulated in a session initiation protocol (SIP) message frame, and the SIP message frame including the 2G-encoded payload is forwarded through the core network.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be distributed as represented by multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1A:
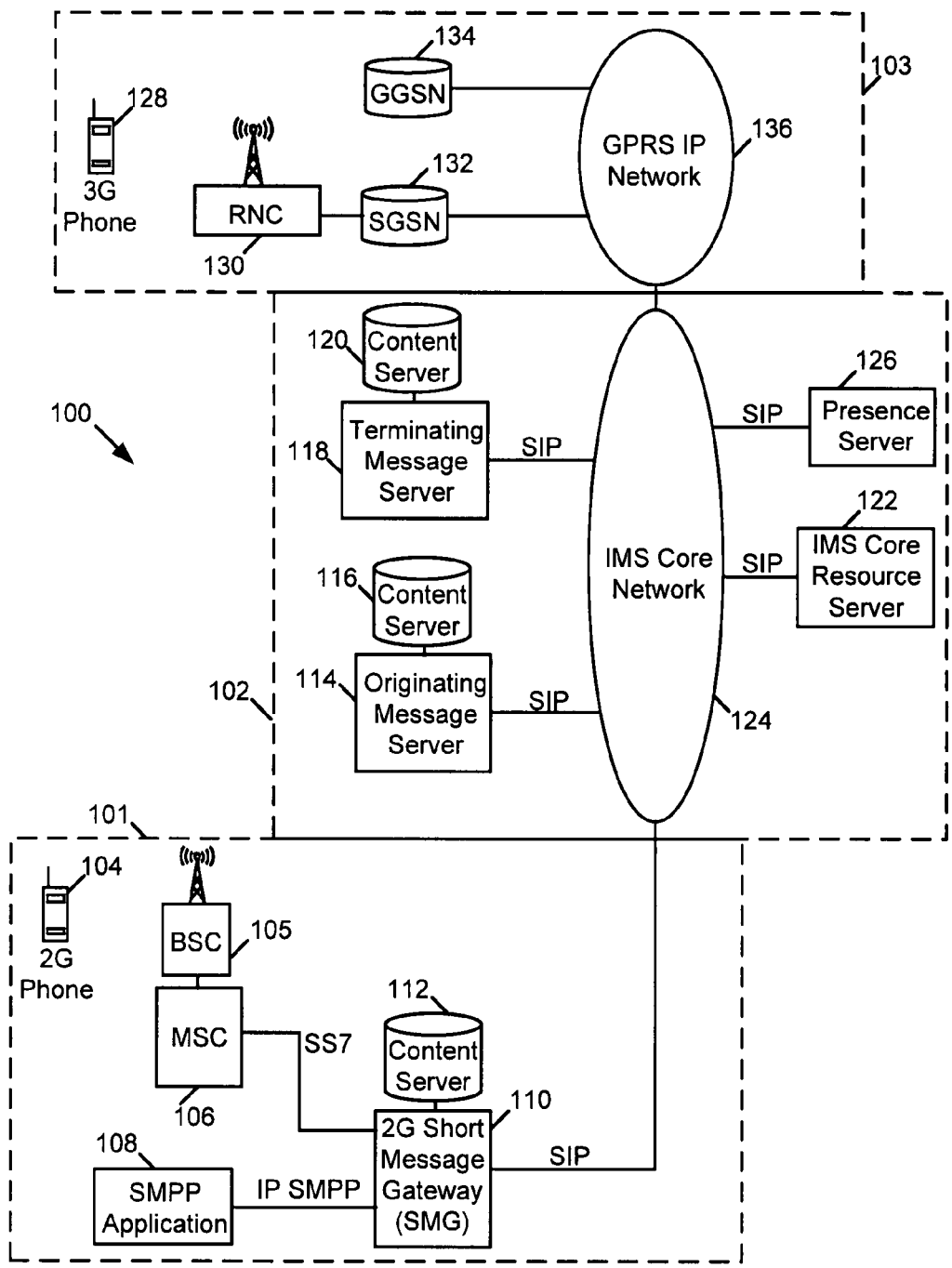
FIG. 1A is a block diagram of an exemplary hybrid 2G/3G cellular network operable to transfer one or more message service messages between messaging entities according to an embodiment of the subject matter described herein.

In view of the problems described above, the subject matter described herein provides methods for methods, systems, and computer program products for transferring a message service payload between messaging entities. FIG. 1A illustrates an exemplary hybrid 2G/3G cellular network environment 100 enabled to transfer one or more message service messages between messaging entities according to an embodiment of the subject matter described herein. In FIG. 1A, hybrid network environment 100 may contain three networks: a 2G cellular network 101, an IP multimedia subsystem (IMS) core 102 including a plurality of session initiation protocol (SIP) servers, and a 3G GPRS network 103.

2G cellular network 102 may include a mobile terminal 104, a base station controller (BSC) 105, a mobile switching center (MSC) 106, a short message peer-to-peer (SMPP) application 108, and a 2G short message gateway (SMG) 110 with an associated content server 112. Mobile terminal 104 may be a cell phone, personal digital assistant, or other client device operable in a 2G cellular network. One or more message service messages may be transferred from mobile terminal 104 through base station controller 105 to mobile switching center 106. If network 101 is a CDMA network that utilizes TIA/EIA encoding standards, the payload of the message service messages may be using the format described in TIA/EIA IS-637, Short Message Services for Dual Mode Wideband Spread Spectrum Cellular Systems, (February 1998), the disclosure of which is incorporated herein by reference in its entirety. Mobile switching center 106 may forward IS-637 message blocks to short message gateway 110 encapsulated in one or more SS7 network message frames. As will be described in more detail below, 2G short message gateway 110 may tunnel the IS-637-encoded payload in an extended SIP message and transmit the extended SIP message over core network 124 for processing and receiving enhanced services. Content server 112 may deliver media content to 2G subscribers, such as the user of 2G phone 104.

IMS core network 102 may include an originating message server 114 with an associated content server 116, a terminating message server 118 with an associated content server 120, an IMS core resource server 122, an IMS core network environment 124, and a presence server 126. Message servers 114 and 118 may perform message service payload interpreting, processing, and tunneling tasks to provide advanced message services between different generation destinations, such as 3G phone 128 and 2G phone 104. Content servers 116 and 120 may provide message service content to be sent to different generation destinations. IMS core resource server 122 may provide IP multimedia subsystem (IMS) services, such as serving call session control function (S-CSCF), interrogating call session control function (I-CSCF), proxy call session control function (P-CSCF), and home subscriber server (HSS) functions to establish sessions to and from IMS-enabled devices. Presence server 126 may collect and deliver presence information for subscribed-to entities. As will be described in more detail below, message servers 114 and 118 may query presence server 126 to obtain message service payload encoding information for delivery message service messages between different generation destinations. In alternate implementations, message servers 114 may query a home subscriber server (HSS) or an E.164 number mapping (ENUM) server to determine the payload encoding type of an intended message recipient.

3G GPRS cellular network 103 may include one or more mobile terminals 128, a radio network controller (RNC) 130, a serving GPRS support node (SGSN) 132, a GPRS gateway support node (GGSN) 134, and a GPRS IP network 136. One or more message service messages may be transferred from mobile terminal 128 through RNC 130 to SGSN 132 in a SIP message frame. SGSN 132 may provide a message gateway function for the one or more message service messages, transferring them into the core IMS network 102 through the GPRS IP network 136. GGSN 134 may provide a message gateway for SIP message transfers to adjacent networks.

Figure 1B:
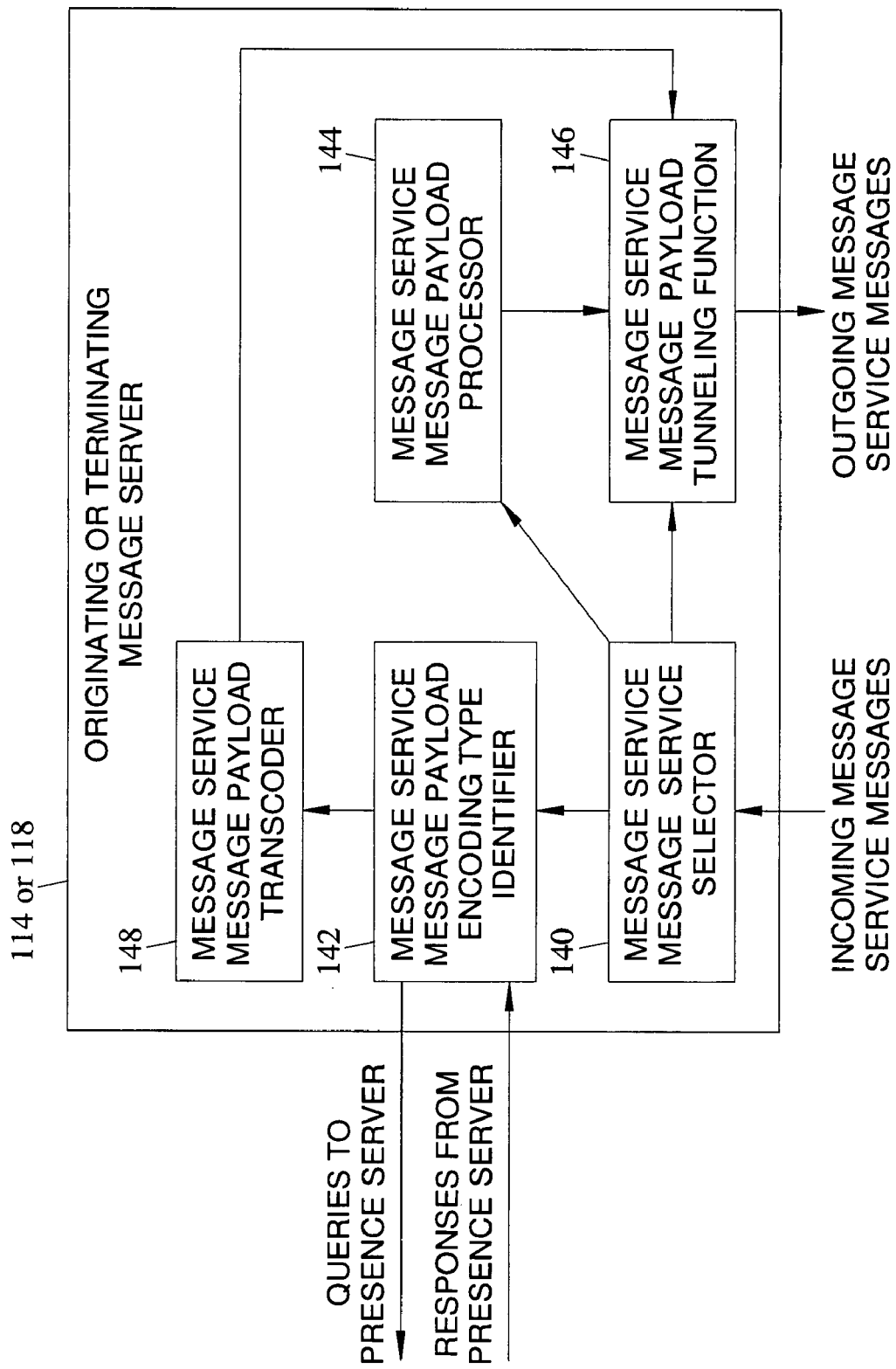
FIG. 1B is a block diagram illustrating exemplary components of a message service message server for identifying message service message payload encoding types, converting message service payloads from one encoding type to another, and for providing service based on information contained within a message service message payload according to an embodiment of the subject matter described herein.

FIG. 1B illustrates exemplary components of originating or terminating message server 114 or 118 for performing message service message payload processing according to an embodiment of the subject matter described herein. Referring to FIG. 1B, originating or terminating message server 114 or 118 includes a message service message service selector 140 for receiving incoming message service messages and identifying a service, such as payload transcoding, processing, or tunneling to be provided for a message. For example, message service message service selector 140 may be capable of decoding IS-637-encoded SMS payloads or GSM-encoded SMS payloads to identify messages requiring processing by payload encoding type identifier 142, payload processor 144, or tunneling function 146. Message service message payload encoding type identifier 142 may identify the payload encoding type associated with a received message service message and with a destination of the message service message. For example, message service message payload encoding type identifier 142 may query a presence server, an ENUM server, or an HSS using information extracted from a received message service message to determine the destination's payload encoding type. A message service message payload transcoder 148 may determine whether the payload encoding format of a received message service message matches the payload encoding format of a destination. If the formats match, message service message payload transcoder 148 may forward the message to the destination with the payload encoded in the received format. If the payload encoding formats do not match, message service message payload transcoder 148 may convert the message service message payload format to that of the destination.

In addition to performing payload trancoding, originating or terminating message service server 114 or 118 may also perform intelligent services based on information extracted from message service message payloads. For example, message service message service selector 140 may decode the message service message payload of a received message and forward the original message or a copy of the original message to message service message payload processor 144. Message service message payload processor 144 may identify a service to be provided for the payload based on information extracted from the payload of the message service message. For example, IS-637 encoded messages include a field that indicates that alert on message delivery service is requested for a message. If message service message payload processor 144 encounters a message with such a field indicating that alert on message delivery is requested, message service message payload processor 144 may provide the service by creating an alert on message delivery format for inclusion in the outgoing message service message sent to the destination. Message service message payload processor 144 may provide any service requested by one or more fields in a message service message payload. Examples of other services that may be provided based on IS-637-encoded payload include any of the following parameters listed in Table 1 below.

TABLE 1

IS-637 Message Parameters

| Subparameter | Service Description |
| --- | --- |
| Message Identifier | Provides message type and a message identification that can be used for acknowledgement |
| User Data | Carries user data |
| Validity Period - Absolute | Indicates to the message center the message expiration time after which the message should be discarded if not delivered to the destination |
| Validity Period - Relative | Indicates to the message center the timer period, beginning from the time the message is received by the message center, after which the message should be discarded if not delivered to the destination. It may also be used to indicate the time period to retain a message sent to a mobile station. |
| Deferred Delivery Time - Absolute | Indicates the absolute time of delivery by the message originator |
| Deferred Delivery Time - Relative | Indicates the relative time of delivery desired by the sender |
| Priority Indicator | Indicates the priority level |

TABLE 1-continued

IS-637 Message Parameters

| Subparameter | Service Description |
|---|---|
| Privacy Indicator | of the message<br>Indicates the desired privacy level of the message |
| Reply Option | Indicates whether SMS acknowledgement is requested |
| Alert on Message Delivery | Indicates whether alerting is requested |
| Language Indicator | Indicates the language of the message so that the mobile station can discard those messages that are not in the users preferred language |
| Call-Back Number | Indicates the number to be dialed to reply to an SMS message |
| Multiple Encoding User Data | Indicates multiple encoding of user data |
| Message Deposit Index | Indicates a unique index of the contents of the user data subparameter in each message sent to a particular mobile station |
| Service Category Program Results | Used to enable or disable SMS broadcast service categories in a mobile station |

Message service message payload processor 144 may decode any of the parameters listed in Table 1 and perform an action to facilitate the providing of the identified service. If the destination handset is an IS-637 handset, message service message payload processor 144 may simply ensure that the requested parameter is included in the outbound message service message. If the destination is not an IS-637 handset, message service message payload processor 144 may map the IS-637 parameter to the corresponding parameter in the outbound message. For example, if the destination handset uses GSM encoding or SIP payload encoding, message service message payload processor 144 may map the IS-637 parameter to the corresponding GSM or SIP parameter. In one implementation, message service message payload processor 144 may encode the payload of a message in a format to facilitate providing of the identified service. For example, message service message payload processor 144 may encode the payload in IS-637 format for transmission through the core network. If the destination is IS-637 compatible, the payload may be transmitted to the destination in IS-637 format. If the destination is not IS-637 compatible, the payload may be converted from IS-637 to the encoding format of the destination.

Message service message payload tunneling function 146 may tunnel outbound message service messages over a network. For example, message service message payload tunneling function 146 may encapsulate message service message payloads in SIP or extended SIP message frames. Exemplary SIP message formats for tunneling message service message payloads will be described in detail below.

Figure 2:
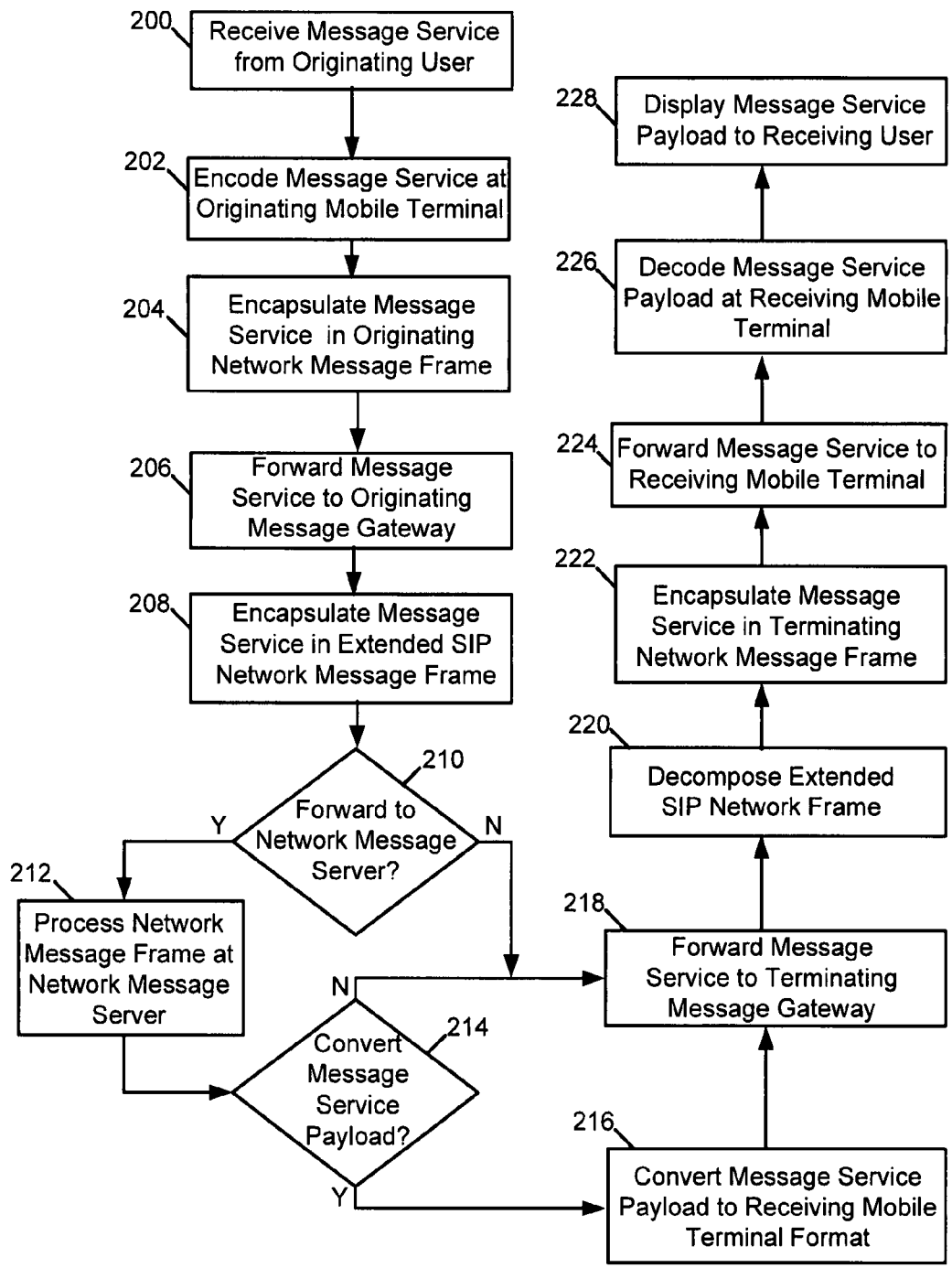
FIG. 2 is a flow chart of an exemplary process for transferring message service messages between messaging entities according to an embodiment of the subject matter described herein.

FIG. 2 illustrates an exemplary process for transferring message service messages between mobile terminals according to an embodiment of the subject matter described herein. For example, message service messages may be transferred between two 2G mobile terminals 102 across an IMS core network 124 conveyed in one or more extended SIP network message frames across core network 124 and then in one or more SS7 message frames between each mobile terminal 102 and associated short message gateway 110. In another exemplary application, a 2G mobile terminal 102 may originate a message service message destined for a 3G mobile terminal 128. The message service message may be transferred from the originating 2G mobile terminal 102 encoded in IS-637 format using a plurality of SS7 and SIP network message frames, transcoded to SIP or other 3G encoding format at originating message server 114 and then transferred to receiving 3G mobile terminal 128 in one or more SIP network message frames. In yet another exemplary application, 3G mobile terminal 128 may be configured with resources to transmit and receive message service messages in either IS-637 encoded format or in SIP or other 3G encoding format using SIP network message frames.

Referring to FIG. 2, at block 200, a user may enter a message service message on an originating mobile terminal. The message may be entered via a keypad, touch screen, or other user interface associated with the originating mobile terminal. If the user is a subscriber in a 2G network, 2G phone 104 may be used to capture the message service message. If the user is a subscriber in a 3G network, 3G phone 128 may be used to capture the message.

At block 202 the mobile terminal may encode the user's message for transfer. For example, if the message service message originates on 2G phone 104, the message service message may be encoded using IS-637 methods as defined for 2G message service message services. If the message service message originates on 3G phone 128, the message block may be maintained in plaintext or other 3G compatible format.

At block 204, the encoded message service message may be encapsulated for transfer to a local message service messaging gateway across the originating network. If the message service message originates on 2G phone 104, the encoded block may be transferred to switching center 106 and then placed in an SS7 message frame. If the message service message originates on 3G phone 128, the message block may be placed in a SIP message frame at the mobile terminal.

At block 206, the message service message in the originating network message frame may be transferred to an originating core network messaging gateway. For example, the message service message originating at the 2G phone 104 may be transferred to 2G short message gateway 110 through mobile switching center 106. The message service message originated at the 3G phone 128 may be transferred in the SIP network message frame to the 3G serving GPRS support node 132 through radio network controller 130.

At block 208, the originating core network messaging gateway may extract the message service message from the network message frame and encapsulate it in an extended SIP network message frame. For example, 2G short message gateway 110 may include resources to remove the IS-637-encoded message originating at 2G phone 102 from the SS7 network message frame and place the IS-637-encoded message block into an extended SIP message frame for transfer across IMS core network 124. If the message service message originated at 3G phone 128, it may already be included in a SIP message frame and may not require additional processing at SGSN 132. To avoid confusion, the remaining steps in FIG. 2 will be discussed for the 2G originating case and then for the 3G originating case.

For the 2G originating case, at decision point 210, originating network messaging gateway 110 may determine if the message service message should be transferred directly to a terminating message gateway or if it should be transferred to an intermediary network message server for additional processing. For example, 2G short message gateway 110 may forward the IS-637-encoded message in a SIP network message frame to originating message server 114 for additional route processing if the receiving mobile terminal is not located in the service provider's network. Gateway 110 may also forward the message service message to originating message server 114 if the message service message has to be converted from 2G IS-637 encoding to SIP or other format for a 3G mobile terminal 128. In another exemplary application, 2G originating message gateway 110 may forward an extended SIP network message frame comprising an IS-637 message block directly to a terminating message gateway to delivery to a receiving 2G mobile terminal. If the message service message is required to be forwarded to a network message server, the process may proceed to block 212; otherwise, it may proceed to block 218. At block 212, the extended SIP message frame comprising the message service message may be forwarded to a network message server for additional processing.

At decision point 214, the network message server may determine if the message service message block in the SIP message frame needs to be transcoded in order to be decodable by the receiving mobile terminal. The term "transcoding" as used herein refers to the conversion of a message service message payload from one format to another format. Transcoding may include mapping map data in header fields associated with the message service payload from one format to another format and mapping the contents of any user data fields to the format expected by the destination. For example, a message service message payload may require transcoding from an IS-637-encoding format to a SIP encoding format, a SIP encoding format to an IS-637 encoding format, a GSM-encoding format to a SIP encoding format, a text format to a GSM-encoding format, an IS-637-encoding format to a GSM-encoding format, or a GSM-encoding format to an IS-637-encoding format. The determination as to whether a message service payload transcoding is required may be determined, for example, by obtaining the destination's message service payload encoding/decoding method by querying a network node with knowledge of the destination's message service payload encoding/decoding method. For example, originating message server 114 may query presence server 126, an HSS, or an ENUM server associated with IMS core resource 126 or associated with the destination network to determine the destination's message service payload encoding/decoding format. Once originating message server 114 determines the message service payload encoding/decoding format required at the destination, originating message server 114 may compare the message service payload encoding/decoding format definition for the destination to the payload encoding/decoding format for the message that is received for delivery. If the message service payload encoding/decoding formats are the same, then payload transcoding is not required and control proceeds to block 218. If the message service payload encoding/decoding formats are not the same, payload transcoding may be required. If transcoding is required, control proceeds to block 216 where the message service payload is converted to the payload encoding format of the receiving terminal. If transcoding is not required, block 216 is bypassed, and control proceeds to block 218.

At block 218, the message service message may be transferred to a terminating core network messaging gateway from either an originating core network messaging gateway or from an intermediary network messaging server. For example, a message service message destined for 2G phone 104 may be forwarded to SMG 110, while a message service message destined for 3G phone 128 may be forwarded to SGSN 132 from IP core network 124 through GPRS IP network 136.

At block 220, the terminating core network messaging gateway may extract the message service message from the core network message frame.

At block 222, the terminating core network messaging gateway may encapsulate the message service message in a terminating sub-network message frame. For example, 2G short message gateway 110 may include resources to remove the IS-637-encoded message service message from the extended SIP network message frame and place the encoded message service message block into a SS7 message frame for transfer receiving mobile terminal 102. Similarly, the terminating messaging gateway function in SGSN 132 may receive a SIP message and forward the message to 3G phone 128.

At block 224, the terminating core network messaging gateway may forward the message service message across the terminating network to the receiving mobile terminal. For example, a message service message terminating at the 2G phone 104 may be transferred in the SS7 network message frame from the 2G short message gateway 110 to mobile switching center 106. Mobile switching center 106 may then forward the message service message to mobile terminal 102 through base station controller 105. A message service message terminating at 3G phone 128 may be transferred in a SIP network message frame from the 3G SGSN 132 through RAN 130.

At block 226, the terminating mobile device may receive the message service message and decode the payload. The terminating mobile device may also implement procedures at block 226 to validate the contents of the message service message and/or the originator of the message service message.

At block 228, the terminating mobile device may display the received message service message on a local graphical user interface for the receiving user to read.

For the 3G originating case, returning to block 210, it is determined whether the message should be forwarded to a network message server for additional processing. If SGSN 132 determines that the message requires additional processing, SGSN 132 forwards the message to an originating message server for the 3G network where the additional processing is performed. For example, terminating message server 118 illustrated in FIG. 1 may function as an originating message server for messages originating from 3G network 103. In blocks 212 and 214, the frame is processed at the network message server. For example, as indicated by decision point 214, it may be determined whether the message service payload encoding is to be converted. If the destination is a 3G destination, and the 3G destination uses a different payload encoding format than that used by originating 3G phone 128, the originating message server may convert the payload encoding type to the 3G payload encoding format of the destination or to a standard format recognized by the 3G destination. In one implementation, 3G terminals may be configured to recognize IS-637 encoding so that they can receive all of the services that are standardized by IS-637. Accordingly, in block 216, for the 3G to 3G case, the payload is converted to a format recognizable by the receiving mobile terminal. In yet another alternate implementation, the payload may be converted to IS-637, and another core network node, such as a terminating 3G message server may convert the payload to a format recognizable by the destination 3G mobile terminal.

In block 218, the message is forwarded to a terminating message gateway. For the 3G to 3G case, the terminating message gateway may be the gateway associated with the destination 3G network. In block 220, the extended SIP network frame in which the message traversed the core network may be decomposed to extract the original SIP message. Block 222 may be bypassed if the terminating SIP network uses the same SIP message format as the originating 3G network. In block 224, the message is forwarded to the receiving mobile terminal. In block 226, the receiving mobile terminal decodes the message service payload. If the payload is IS-637 encoded and the 3G terminal includes such decoding capabilities, the 3G terminal may decode the payload and receive or provide any services requested by the IS-637 encoded payload. If the payload is encoded in the SIP encoding format of the receiving mobile terminal, the receiving mobile terminal may simply decode the SIP encoded payload and receive or provide the identified services. In block 228, the content in the message service payload intended for display to the user is displayed. Thus, even when messages are transmitted between like generation terminals, IS-637 may be used as a standard way to communicate services through the core network.

Exemplary IS-637 Message Block Transfer in a SIP Network

Figure 3:
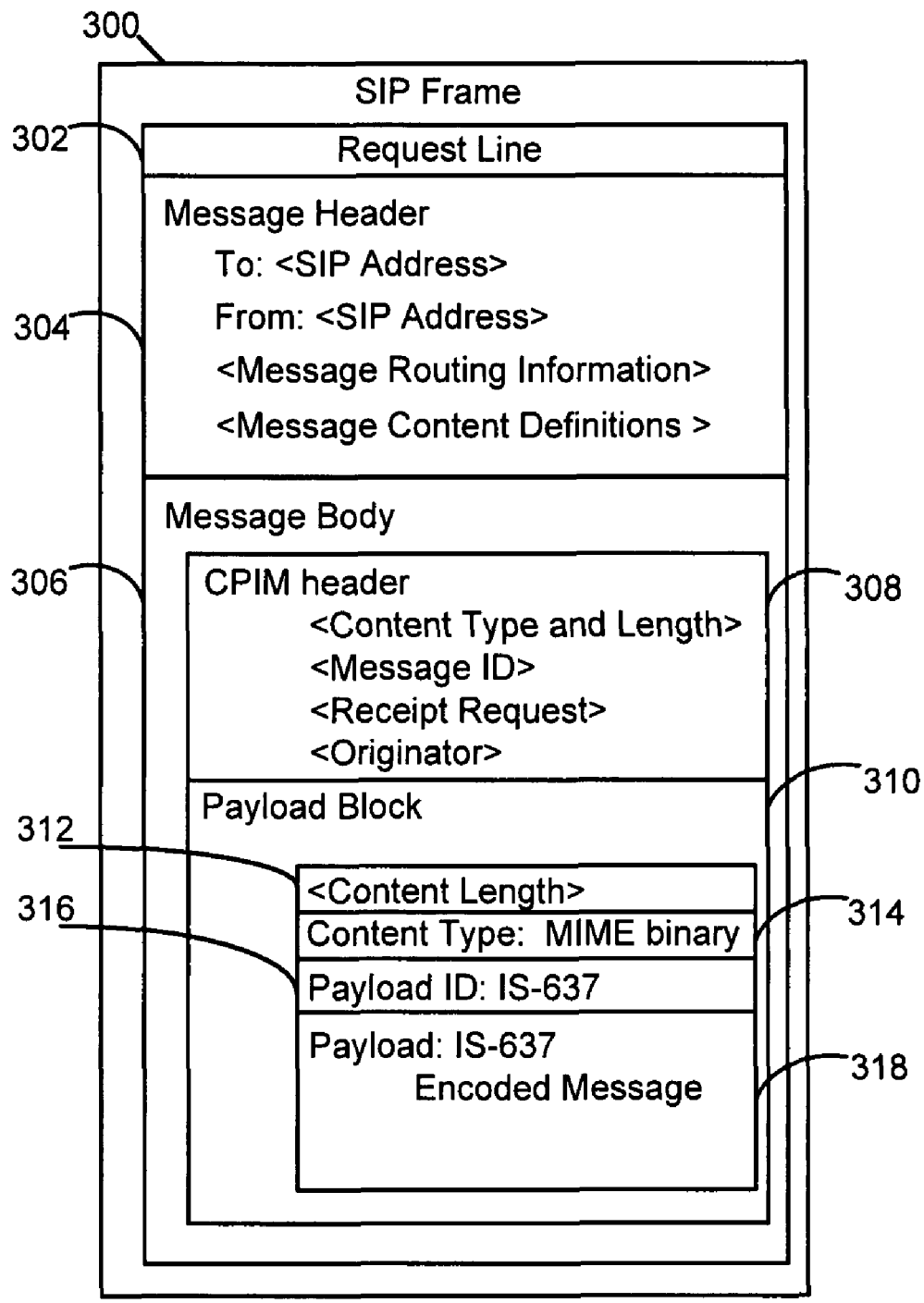
FIG. 3 is a diagram of an exemplary extended SIP network message frame comprising an IS-637 encoded payload according to an embodiment of the subject matter described herein.

FIG. 3 illustrates an exemplary extended SIP network message frame 300 comprising an IS-637 encoded payload according to an embodiment of the subject matter described herein. For example, extended frame 300 may be used to transfer a message service message block between two 2G mobile terminals 104 across an IMS core network 124. In FIG. 3, extended SIP frame 300 may comprise a request line 302, a message header block 304, and a message body 306.

Request line 302 may include a message type indication and a SIP destination address. The message type indication and the destination address may be of a format suitable for SIP network message processing.

Message header block 304 may include a plurality of general message routing data fields, including a SIP origination address, a SIP destination address, a message sequence number, and/or other suitable parameters for message processing and transfer across a SIP network. Information supplied in the routing data fields may be of a format suitable for SIP network message processing.

Message body 306 may include a common presence for instant messaging (CPIM) header block 308 and a payload block 310. CPIM header block 308 may further include data fields with processing information for payload block 310 and/or a SIP origination node identifier. Information supplied in CPIM header block 308 data fields may be of a format suitable for SIP network message processing.

Payload block 310 may include a content length field 312, a content type field 314, a payload identifier field 316, and a payload 318. Content length field 312 may include a data element whose value may indicate the total number of bytes in the message block, in a format suitable for SIP message processing. Content type field 314 may include a character string indicating the general format of the content of payload block 318. For example, content type field 314 instantiations may comprise "plaintext" and "MIME binary". Payload identifier 316 may include a character string indicating a specific coding method used to generate the contents of message block 318. For example, payload identifier 316 instantiations may comprise "plaintext" and "IS-637". Message block 318 may include the message service message block received, encoded, and encapsulated at the originating mobile terminal using procedures associated with blocks 200, 202, and 204.

An exemplary extended SIP network message frame 300 containing a message service message payload 318 originating at 2G mobile terminal 102 may be comprised as follows:

---

Session Initiation Protocol
  Request-Line: MESSAGE sip:+17072393216@myvzw.com SIP/2.0
  Message Header
    To: <sip:+17072393216@myvzw.com>
      SIP to address: sip:+17072393216@myvzw.com
    From: <sip:+17072393208@myvzw.com>;tag=40317b54
      SIP from address: sip:+17072393208@myvzw.com
      SIP tag: 40317b54
    Via: SIP/2.0/UDP 66.174.75.72;branch=z9hG4bK7e2b.bf211e26.0
    Via: SIP/2.0/UDP 66.174.75.74:5060;branch=z9hG4bK-d87543-
        4e1767124a6e341d-1--d87543-;rport=5060
    Call-ID: 3f61090b9a0e845c@bXMxX2NzMQ..
    CSeq: 2 MESSAGE
    Route: <sip:term&transit@sip.tekcore2.myvzw.com; lr>
    Max-Forwards: 69
    Allow: MESSAGE
    Content-Type: message/cpim
    P-Asserted-Identity: <sip:+17072393208@myvzw.com>;tag=-
        882752480
    Content-Length: 251
  Message body
    Content-Length: 10\r\n
    Content-type: text/plain \r\n
    dsn.Message-Id: z9hG4bK-f790bd94-bf2f-6e41\r\n
    dsn.Receipt-Request: positive-delivery, negative-delivery\r\n
    From: 7072393208 <sip:+17072393208@myvzw.com>\r\n
    NS: dsn <http://www.ietf.org/ns/cpim-dsn>\r\n
    Content-Length: 64\r\n
    Content-type: MIME binary/8-bit
    84=583459085238585409234=85
    5978345&*(& )))+___0959(*__(*__
    *(*__(*(*)(*Fjkdsjfkljkdjfsdfudms;fdff

---

Figure 4:
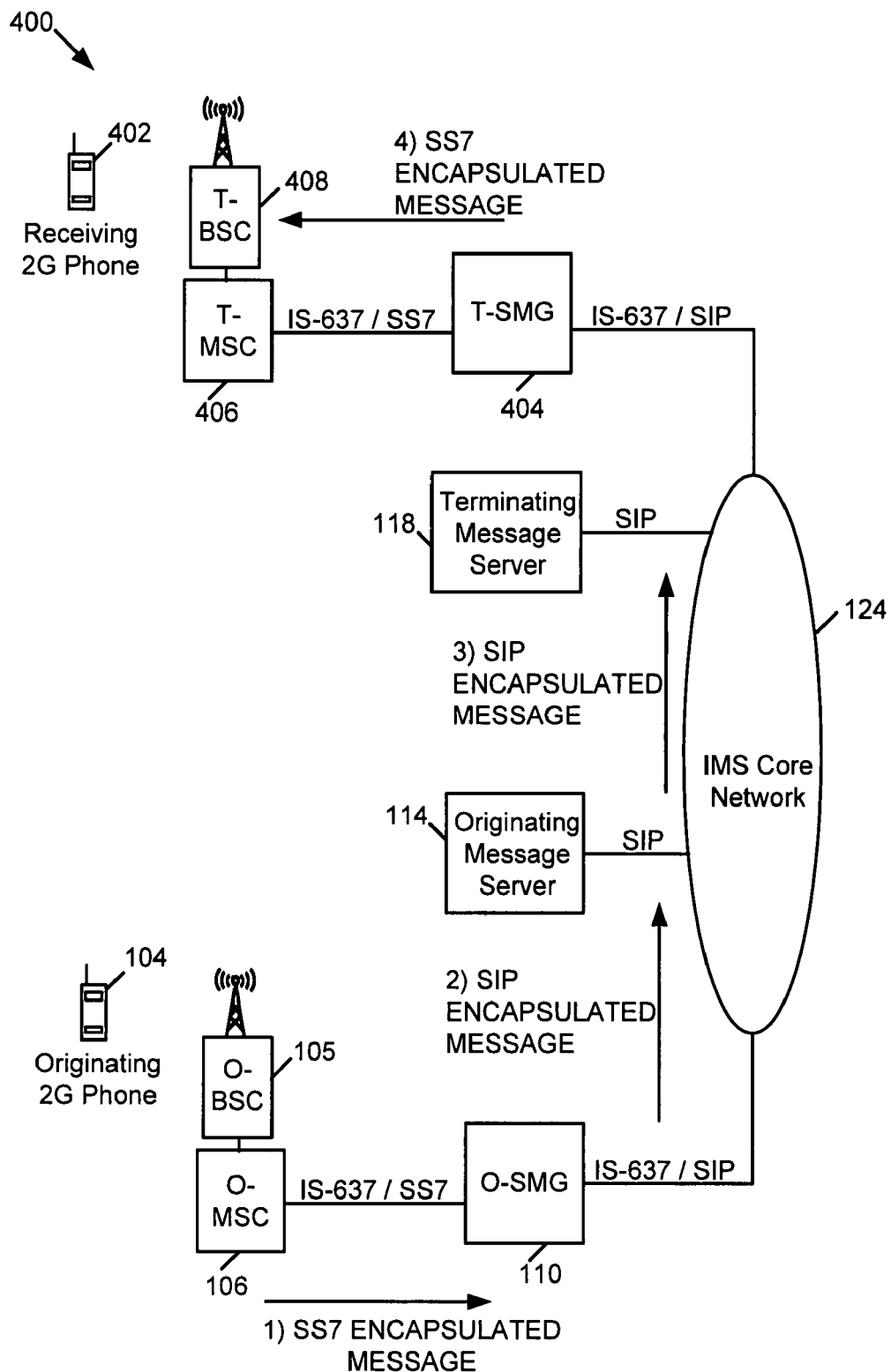
FIG. 4 is a block diagram of an exemplary hybrid 2G/3G cellular network wherein an originating 2G mobile terminal sends a message service message to a receiving 2G mobile terminal through a core SIP network according to an embodiment of the subject matter described herein.

FIG. 4 illustrates an exemplary cellular network 400, wherein originating 2G mobile terminal 104 sends a message service message to a receiving 2G mobile terminal 402 through IMS network 124. In FIG. 4, network 400 may include a plurality of 2G mobile terminals 104 and 402 and IMS core network 124, which is operable to transfer message service messages encoded in IS-637 format from mobile terminal 104 to mobile terminal 402 using an extended SIP network message frame 300 according to an embodiment of the subject matter described herein. Network 400 may include an originating base station controller (O-BSC) 105, an originating mobile switching center (O-MSC) 106, an originating short message gateway (O-SMG) 412, an originating message server 414, a terminating message server 110, a terminating short message gateway (T-SMG) 404, a terminating mobile switching center (T-MSC) 406, and a terminating base station controller (T-BSC) 408.

Mobile terminal 104 may receive and encode a message service message destined for receiving 2G mobile terminal 402 according to procedures associated with blocks 200 and 202 of FIG. 2. The resultant IS-637-encoded message block may be transferred from mobile terminal 104 through originating base station controller 105 to originating mobile switching center 106. Mobile switching center 106 may forward the IS-637-encoded message block in an SS7 network message frame to short message gateway 110.

Originating short message gateway 110 may transfer the message block from the SS7 network message frame to an extended SIP network message frame 300. Content type field 314 in extended SIP frame 300 may be instantiated with the string "MIME binary", and payload identifier field 316 may be instantiated with the string "IS-637". Other header fields in extended frame 300 may be instantiated as required by resources in the IMS core sub-system for message routing.

Alternatively, short message gateway 110 may forward the received SS7 message including the IS-637-encoded payload originating message server 114 for further processing.

Originating short message gateway 110 may forward the extended SIP network message frame including the message service message payload, either directly to terminating short messaging gateway 404 or to originating message server 114. For example, if the message service message from mobile terminal 104 is to be delivered to receiving 2G mobile terminal 402 in another service provider's network, originating message server 114 may be required to process the IS-637 payload to provide a message service function, such as delivery alert service. In another exemplary application, the extended SIP network message frame may be transferred directly to terminating short messaging gateway 404 without further processing. Terminating short message gateway 404 may receive extended SIP network message frame 300 from IMS core network 124.

Terminating short message gateway 404 may extract the message service message payload from extended SIP network message frame 300 and encapsulate it in a SS7 network message frame. Short message gateway 404 may then forward the SS7 network message frame including the message service message to payload terminating mobile switching center 406. Mobile switching center 406 may then extract the message service message payload and forward it to receiving 2G mobile terminal 402 through terminating base station controller 408. Receiving mobile terminal 402 may decode and display the message service message using procedures associated with blocks 226 and 228 illustrated in FIG. 2.

Exemplary Message Service Message Payload Transcoding

Figure 5:
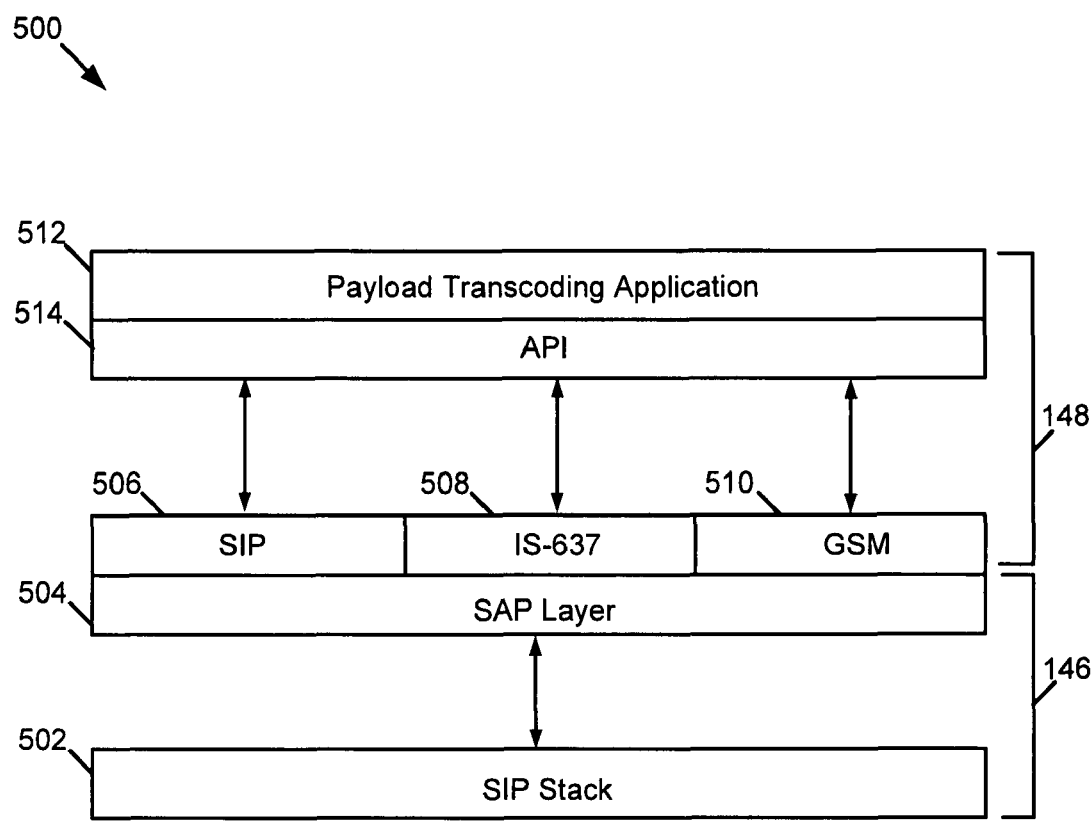
FIG. 5 is a block diagram of an exemplary message service message transcoder according to an embodiment of the subject matter described herein.

FIG. 5 illustrates an exemplary message service message format transcoder 148 and tunneling function 146 according to an embodiment of the subject matter described herein. As illustrated in FIG. 1B transcoder 148 may be instantiated in originating network message server 114 or terminating message server 118. Transcoder 148 may be used in network 100 to change the payload encoding format of a message service message block for message service message transfer between dissimilar mobile terminals. For example, in FIG. 1A, a user may wish to send a message service message from a 2G mobile terminal 104 to a colleague using a 3G mobile terminal 128. In FIG. 5, tunneling function 146 includes SIP stack 502 and a service application point (SAP) layer 504. Payload transcoder 148 includes SIP message processing instance 506, an IS-637 message processing instance 508, a GSM message processing instance 510, and payload transcoding application 512 with application programming interface (API) 514.

SIP stack 502 may implement all message transfer operations with external SIP network resources and may provide message encoding or de-coding functions. For example, stack 502 may receive an extended SIP network message frame 300 (illustrated in FIG. 3) from a SIP node across IMS core network 124. Stack 502 may decode request line 302 and message header 304 to validate source and destination addresses and to implement any SIP protocol operations defined by the other fields in message header 304. Stack 502 may also extract message body 306 to be forwarded to SAP layer 504 for additional processing. In another exemplary application, stack 502 may receive a message body 306 from SAP layer 504 to encapsulate in an extended SIP network message frame 300 and transmit to a destination SIP node across IMS core network 124. Stack 502 may insert the destination address or routing information in request line 302 and message header 304 before transmitting the frame.

SAP layer 504 may manage a plurality of messaging queues for message service message traffic management. For example, layer 504 may receive one or more SIP message bodies 306 forwarded from stack 502. Layer 504 may further decompose the one or more message bodies 306 and process the contents of CPIM header 308. Layer 504 resources may then place the payload block 310 onto a message queue directing the block to message processing instance 506, 508, or 510. In another exemplary application, layer 504 may receive a payload block 310 from message processing instance 506, 508, or 510 to be transmitted on the IMS core network 124. Layer 504 resources may validate the structure of payload block 310 and then assemble a message body 306 comprising the payload block 310 and CPIM header block 308. The assembled message body 306 may then be transferred to SIP stack 502 for final processing and transmission.

Message processing instances 506, 508, and 510 may provide resources to operate on payload block 310 and transfer the message service message to payload transcoding application 512 using an interface provided by application programming interface 514. Message processing instance 506 may include resources to operate on plaintext message blocks, while message processing instance 508 may include resources to operate on message blocks encoded using IS-637 methods as required for 2G mobile terminal operation. Message processing instance 510 may include resources to support GSM encoding formats. For example, message processing instance 506, 508, or 510 may receive a payload block 310 from SAP layer 504 for additional processing. Message processing instance 506, 508, or 510 may decompose payload block 310, validate its contents, and then forward payload 318 to application 512 through API 514. In another exemplary application, message processing instance 506, 508, or 510 may receive a transcoded message block 318 from application 512 through API 514 to be transmitted on IMS core network 124. Message processing instance 506, 508, or 510 may assemble a payload block 310 comprising message block 318, payload identifier 316, content type field 314, and content length field 312. The assembled payload block 310 may be forwarded to service application point layer 504 for further processing.

Payload transcoding application 512 may provide procedures to implement payload transcoding operations. For example, one procedure may convert a text or MIME payload in a SIP message from a 3G mobile terminal into an IS-637-encoded or a GSM-encoded payload destined for a 2G mobile terminal. A different procedure may decode an IS-637-encoded payload from a 2G mobile terminal and convert the contents to a SIP-encoded format suitable for a 3G mobile terminal to receive and display.

Application programming interface 514 may provide a consistent set of resources for each message processing instance 506, 508, or 510 to transfer message blocks to application 512 for processing. API 514 may also include resources to facilitate transfer of message blocks resulting from operation of application 512 to the appropriate message processing instance 506, 508, or 510.

Figure 6:
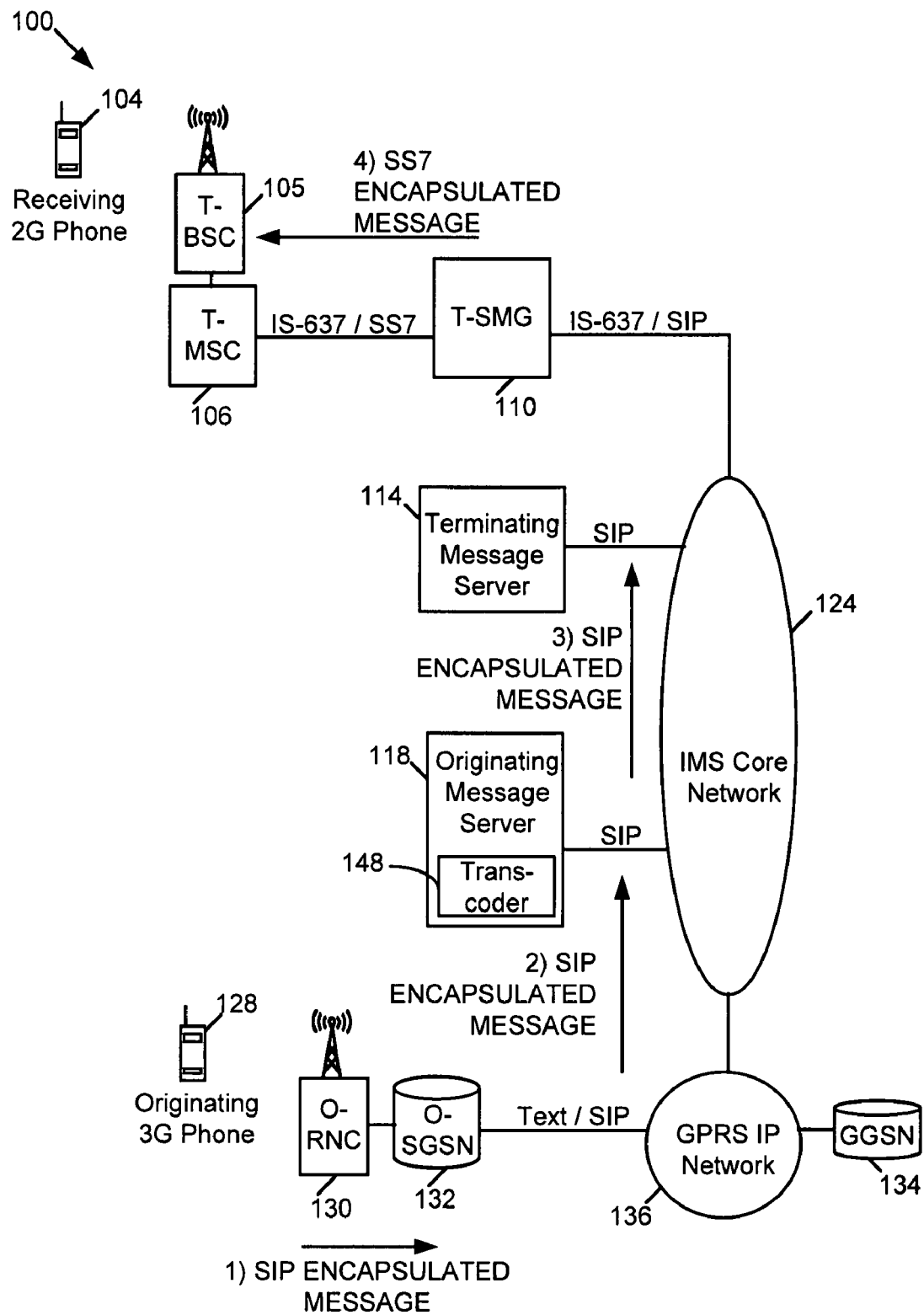
FIG. 6 is a block diagram of an exemplary hybrid 2G/3G cellular network wherein an originating 3G mobile terminal sends a message service message to a receiving 2G mobile terminal according to an embodiment of the subject matter described herein.

FIG. 6 illustrates network 100 where 3G mobile terminal 128 sends a message service message to 2G mobile terminal 104 through core IMS network 124. Network 124 may be operable to transfer an IS-637-encoded message block in an extended SIP network message frame 300 and may contain a message service message transcoder 144. In FIG. 6, network 100 includes an originating radio network controller (O-RNC) 130, originating serving GPRS support node (O-SGSN) 132, a gateway GPRS support node (GGSN) 134, GPRS IP network 136, message server 118, message server 114, terminating short message gateway (T-SMG) 110, terminating mobile switching center (T-MSC) 106, and terminating base station controller (T-BSC) 105.

Originating 3G mobile terminal 128 may receive (from a user) and encode a message service message destined for receiving 2G mobile terminal 104 in a SIP network message frame according to procedures associated with blocks 200 and 202. The resultant 3G-encoded message may be transferred from mobile terminal 128 through originating radio network controller 130 to O-SGSN 132. O-SGSN 132 may transfer the SIP network message frame to originating message server 118 through GPRS IP network 136 and IMS core network 124.

Originating message server 118 may receive the SIP frame with the message service payload. Message server 118 may decompose the received SIP message frame and pass the message service message through transcoder 144 to encode the SIP-encoded payload into an IS-637 payload suitable for receiving 2G mobile terminal 104. Message server 118 may then encapsulate the encoded message service message block in an extended SIP network message frame 300, instantiating content type field 314 with the string "MIME binary" and instantiating payload identifier field 316 with the string "IS-637". Message server 118 may forward the resultant extended SIP network messaging frame to terminating short messaging gateway 110 through IMS core network 124.

Terminating short message gateway 110 may receive extended SIP network messaging frame 300 from IMS core network 124. Gateway 110 may decompose extended SIP frame 300, extract the encoded message service message block, encapsulate the message service message in a SS7 message frame, and transfer the SS7 message frame to terminating mobile switching center 106. Mobile switching center 106 may extract the message service message and forward it to receiving 2G mobile terminal 104 through terminating base station controller 104. Receiving mobile terminal 104 may decode and display the message service message using procedures associated with blocks 226 and 228 illustrated in FIG. 2.

Figure 7:
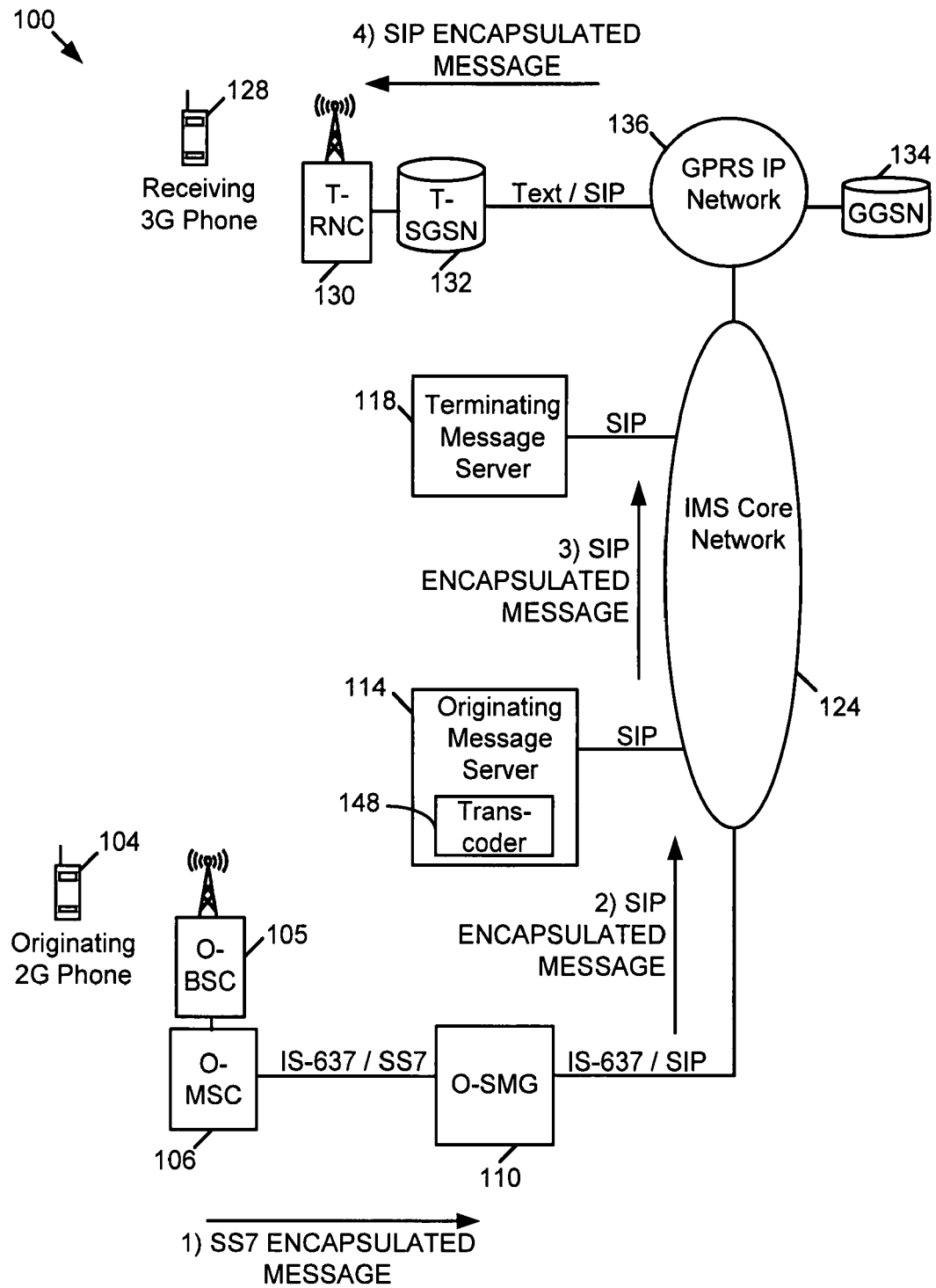
FIG. 7 is a block diagram of an exemplary hybrid 2G/3G cellular network wherein an originating 2G mobile terminal sends a message service message to a receiving 3G mobile terminal according to an embodiment of the subject matter described herein.

FIG. 7 illustrates an example where network 100 is used for transfer of a message service message from 2G mobile terminal to 3G mobile terminal 128 through IMS core network 124. Network 100 may be operable to transfer an IS-637-encoded payload in an extended SIP network message frame 300 and may contain a message service message transcoder 148. In FIG. 7, network 100 includes originating base station controller (O-BSC) 105, originating mobile switching center (O-MSC) 106, originating short message gateway (O-SMG) 110, originating message server 114, terminating message server 118, a GPRS IP network 124, gateway GPRS support node 134, terminating serving GPRS support node (T-SGSN) 132, and terminating radio network controller (T-RNC) 130.

Originating 2G mobile terminal 104 may receive and encode a message service message destined for receiving 3G mobile terminal 704 according to procedures associated with blocks 200 and 202 illustrated in FIG. 2. The resultant IS-637-encoded message block may be transferred from 2G mobile terminal 104 through originating base station controller 105 to originating mobile switching center 106. Mobile switching center 106 may forward the encoded message block in an SS7 network message frame to originating short message gateway 110.

Originating short message gateway 110 may transfer the message service message block from the SS7 network message frame to an extended SIP network message frame 300. Content type field 314 in extended SIP frame 300 may be instantiated with the string "MIME binary", and payload identifier field 316 may be instantiated with the string "IS-637". Other header fields in extended frame 300 may be instantiated as required by resources in the IMS core subsystem.

Originating short messaging gateway 110 may forward the extended SIP network message frame to originating message server 114. Message server 114 may receive extended SIP frame 300 containing the encoded message service message payload from mobile terminal 104 and decompose the extended SIP network message frame to extract the payload. Transcoder 144 may convert the encoding type of the payload to that of 3G mobile terminal 128. Message server 114 may then encapsulate the plaintext message service message in a SIP network message frame and forward the frame to terminating SGSN 132 through IMS core network 124 and GPRS IP network 136.

Terminating SSGN 132 may receive the SIP network message frame including the message service message payload and may forward the SIP network message frame to receiving 3G mobile terminal 128 through terminating radio network controller 130. Receiving 3G mobile terminal 128 may decompose the SIP network message, extract the message service message payload, and display the payload using procedures associated with blocks 226 and 228 illustrated in FIG. 2.

Intelligent Message Service Payload Processing

Figure 8:
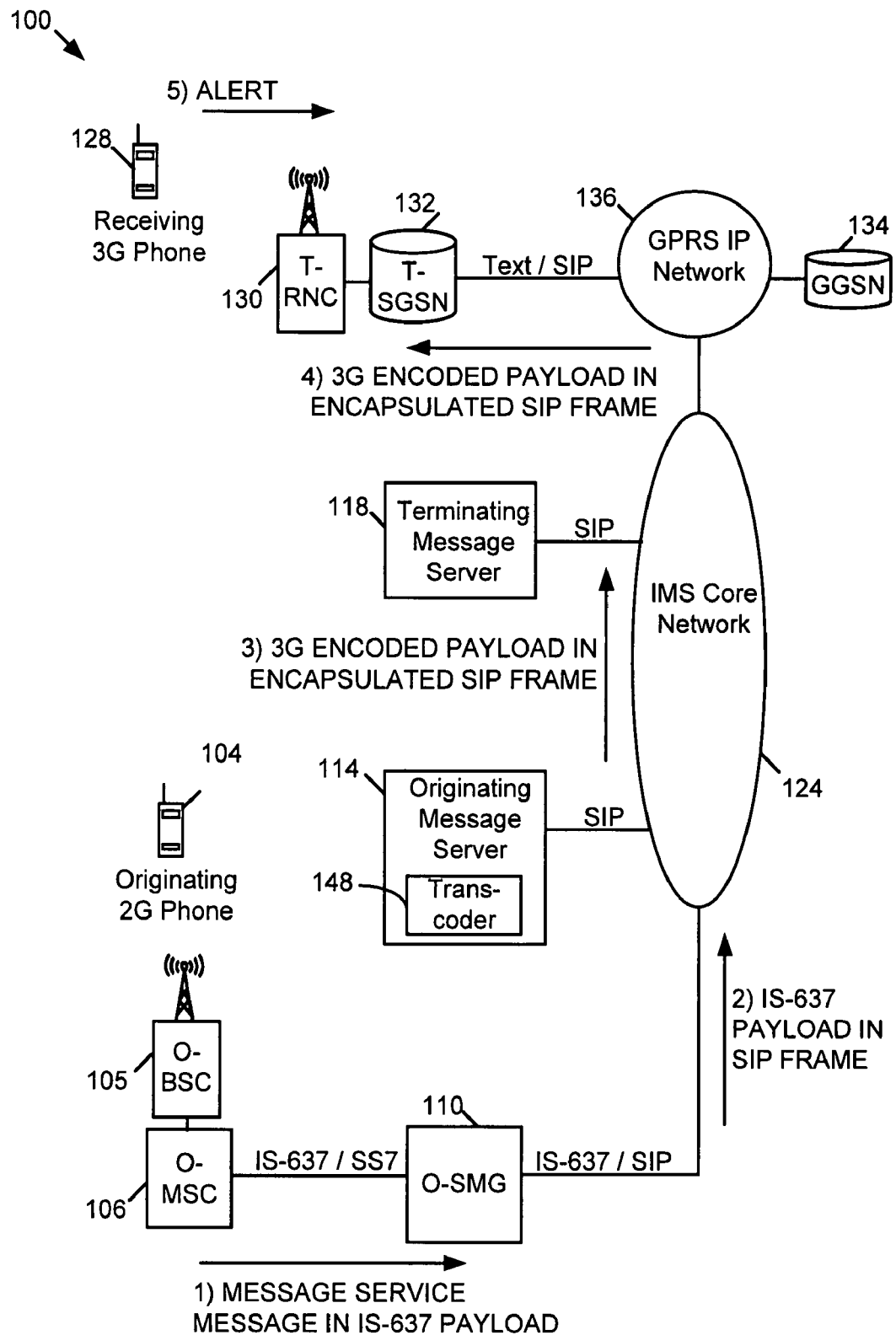
FIG. 8 is a block diagram of a hybrid cellular network illustrating exemplary messaging associated with providing message delivery confirmation service according to an embodiment of the subject matter described herein.

As stated above, one function that may be provided by a message server according to an embodiment of the subject matter described herein includes decoding a payload of a message service message, determining a service to be applied to the message based on the payload, and providing the service. FIG. 8 illustrates exemplary messaging associated with providing alert on delivery service based on information in a message service message payload according to an embodiment of the subject matter described herein. Referring to FIG. 8, MSC 106 originates a message service message destined for receiving 3G mobile phone 128. The message service message may include an IS-637 payload. Originating short message gateway 110 receives the message and encapsulates the IS-637 payload in a SIP frame. Originating short message gateway 110 may forward the message to originating message server 114 via core network 124. Originating message server 114 may decode the IS-637 payload and determine that a service, such as alert on delivery, is required. If payload transcoding is required, originating message server 114 may insert data in the format and location in the payload expected by receiving terminal 128 indicating that alert on delivery service is requested. Originating message server 114 forwards the 3G-encoded payload in a SIP frame to SGSN 132 via core network 124 and GPRS network 136. SGSN 132 forwards the message to receiving 3G terminal 128 via RNC 130.

Receiving 3G phone 128 receives the message and decodes the payload. Receiving 3G phone 128 may identify the indication in the message inserted by originating message server 114 requesting alert on delivery and may generate the corresponding vibration or tone. Accordingly, using the messages illustrated in FIG. 8, a message payload can be decoded and used to identify and provide advanced services in hybrid telecommunications network environments.

Exemplary 3G Mobile Terminal with Multiple Text Messaging Clients

Figure 9:
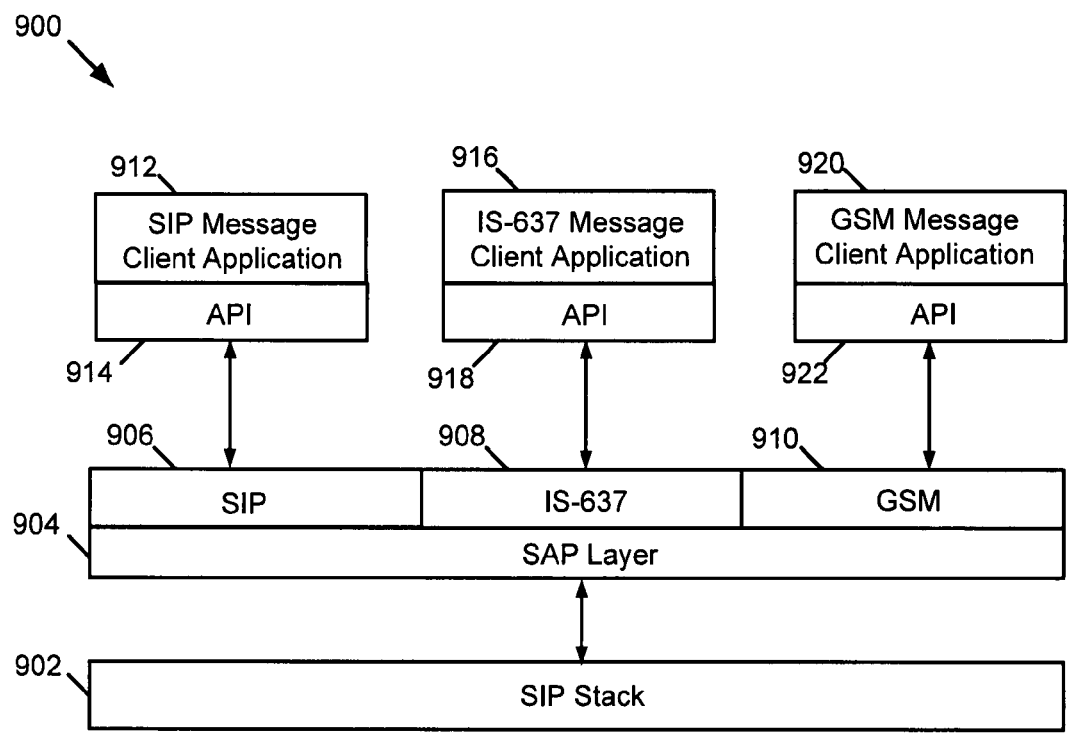
FIG. 9 is a block diagram of an exemplary 3G mobile terminal processor operable to support a plurality of message service message payload encoding protocols, including plaintext, IS-637, and GSM, according to an embodiment of the subject matter described herein.

FIG. 9 illustrates an exemplary 3G mobile terminal message service message processor 900 operable to support a plurality of message service message transfer protocols, including plaintext and IS-637, according to an embodiment of the subject matter described herein. For example, a 3G mobile terminal comprising message processor 900 may be operable in a hybrid 2G/3G network that does not include a message transcoder 500 in a network message server. In FIG. 9, message processor 900 may include a SIP stack 902, a service application point (SAP) layer 904, a SIP message processing instance 906, an IS-637 message processing instance 908, a proprietary message processing instance 910, a SIP client application 912 with application programming interface (API) 914, an IS-637 client application 916 with API 918, and a proprietary protocol client application 920 with API 922.

SIP stack 902 may implement all message transfer operations between the mobile terminal and a 3G serving GPRS support node 132 through a radio network controller 130, and may provide message encapsulation or decomposition functions. For example, stack 902 may receive an extended SIP network message frame containing a message service message from a 2G mobile terminal encoded in IS-637 format. Stack 902 may decode SIP request line 302 and message header 304 to validate source and destination addresses and to implement any SIP protocol operations defined by the other fields in message header 304. Stack 902 may also extract message body 306 to be forwarded to service application point layer 904 for additional processing. In another exemplary application, stack 902 may receive a message body 306 from SAP layer 904 to encapsulate in an extended SIP network message frame 300 and transmit to a 2G mobile terminal. Stack 902 may validate the destination address or routing information in request line 302 and message header 304 before transmitting the frame.

SAP layer 904 may manage a plurality of messaging queues for message service message traffic management. For example, layer 904 may receive one or more SIP message bodies 306 forwarded from stack 902. Layer 904 may further decompose the message bodies 306 and process the contents of CPIM header 308. Layer 904 resources may then place the payload block 310 onto a message queue directing the block to the proper message processing instance 906, 908, or 910. In another exemplary application, layer 904 may receive a payload block 310 from message processing instance 906, 908, or 910 to be transmitted to the receiving mobile terminal. Layer 904 resources may validate the structure of payload block 310 and then assemble a message body 306 comprising the payload block 310 and CPIM header block 308. The assembled message body 306 may then be transferred to SIP stack 902 for final processing and transmission.

Message processing instances 906, 908, and 910 may provide resources to operate on payload block 310 and transfer the message service message to one of a plurality of message client instances. Message processing instance 906 may include resources to operate on message blocks encoded in SIP-compatible formats, while message processing instance 908 may include resources to operate on message blocks encoded using IS-637 methods and message processing instance 910 may include resources to support GSM encoding formats. For example, processing instance 908 may receive an IS-637 payload block 310 from layer 904 for additional processing and forwarding to IS-637 message client 916. Instance 908 may decompose the payload, validate its contents, and then forward the payload to client 916 through API 918. In another exemplary application, processing instance 906 may receive a SIP-encoded message block from SIP message client application 912. Instance 906 may assemble a payload block including a message block, a payload identifier, a content type field and a content length field as described above with respect to FIG. 3. The assembled payload block 310 may be forwarded to SAP layer 504 for further processing.

SIP message client 912 and associated API 914 may receive and process one or more payloads forwarded from message processing instance 906 and may source one or more messages to message processing instance 906 for encapsulation and delivery to a 3G mobile terminal or SIP network node.

IS-637 client 916 and associated API 918 may receive and process one or more IS-637 message blocks forwarded from message processing instance 908, and may encode and source one or more message service message blocks to message processing instance 908 for ultimate delivery to a 2G mobile terminal.

GSM protocol client 920 and associated API 922 may receive and process one or more message blocks forwarded from message processing 910, and may encode and source one or more message blocks to message processing instance 910 for delivery to a destination node.

Exemplary Message Payload Processing and Conversion Methods

Figure 10:
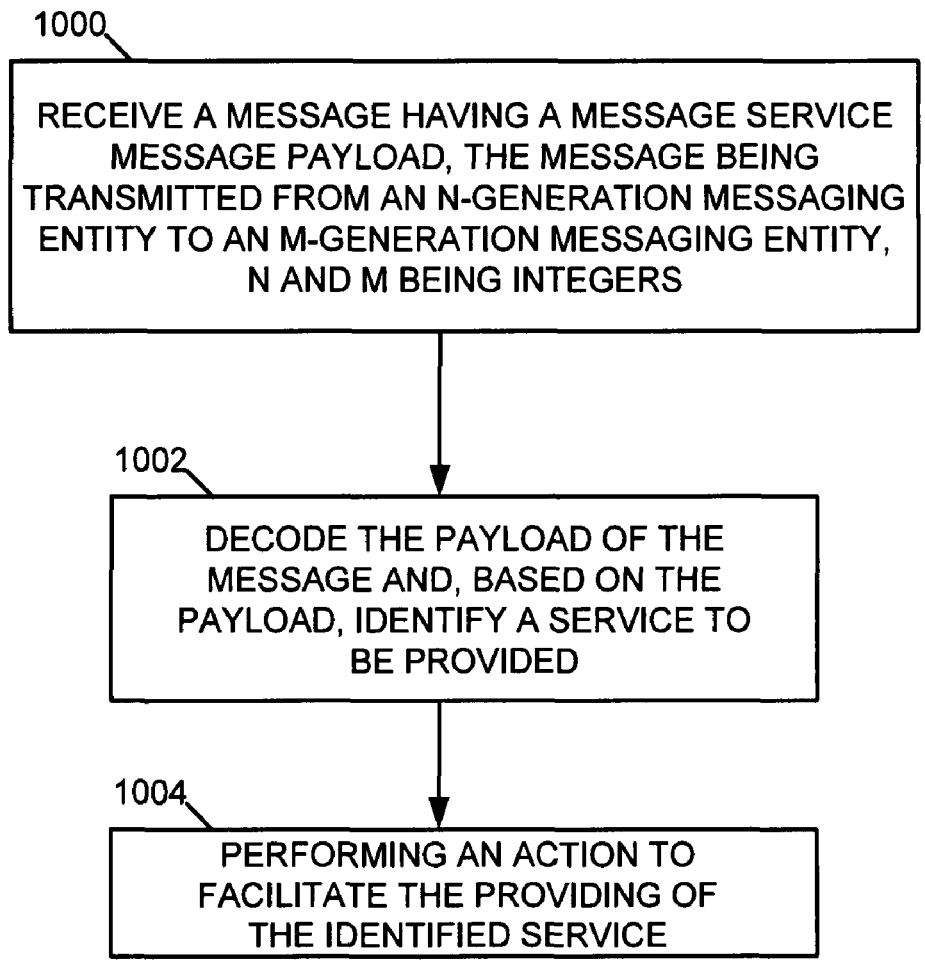
FIG. 10 is a flow chart of an exemplary process for intelligently processing a message service payload being transmitted between messaging entities according to an embodiment of the subject matter described herein.

FIG. 10 is a flow chart of an exemplary process for intelligently processing a message service payload being transmitted between different generation destinations according to an embodiment of the subject matter described herein. For example, a user on a 2G mobile terminal may have a requirement to forward an SMS message to a user on a 3G mobile terminal. In FIG. 10, at block 1000 a core network element receives a message having a message service message payload, the message being transmitted from an N-generation terminal and an M-generation terminal, of at least 2 and M being an integer of at least 1. For example, an originating message server 114 in core network 102 may receive a message service message from a 2G phone 104 via BSC 105, MSC 106 and originating short message gateway 110, destined for a 3G phone 128.

At block 1002, core IMS network 102 decodes the payload of the message and, based on the payload, identifies a service to be provided. For example, a message service message received from 2G terminal 104 may be decoded and processed by one or more message servers 114 and/or 118 in cellular network 100 to determine that a return receipt is to be provided to the originator of the message.

At block 1004, and action is performed to facilitate the providing of the identified service. The action may include encoding the payload in a format that facilitates the providing of the identified. For example, originating message server 114 may encode the payload in IS-637 format for transmission across core network 102. If the destination is a 2G messaging entity, the IS-637 payload may be communicated to the 2G messaging entity. If the destination is a 3G messaging entity with IS-637 processing capabilities, the IS-637 encoded payload may be communicated to the 3G messaging entity. If the destination is a 3G messaging entity without IS-637 processing capabilities, the IS-637 encoded payload may be converted to the payload encoding format of the destination, for example, by terminating message service 118 illustrated in FIG. 1.

In another example, the action may include providing the identified service at the message server in the core network. For example, the message server in the core network may decode the payload and identify that content-based billing is required. In this instance, the message server may generate a call detail record (CDR) for the message service message that identifies the content type. The CDR may be used by a billing system to bill the sending or receiving subscriber based on the identified content type. For example, a subscriber may be charged more for sending images or audio files than for sending text.

Figure 11:
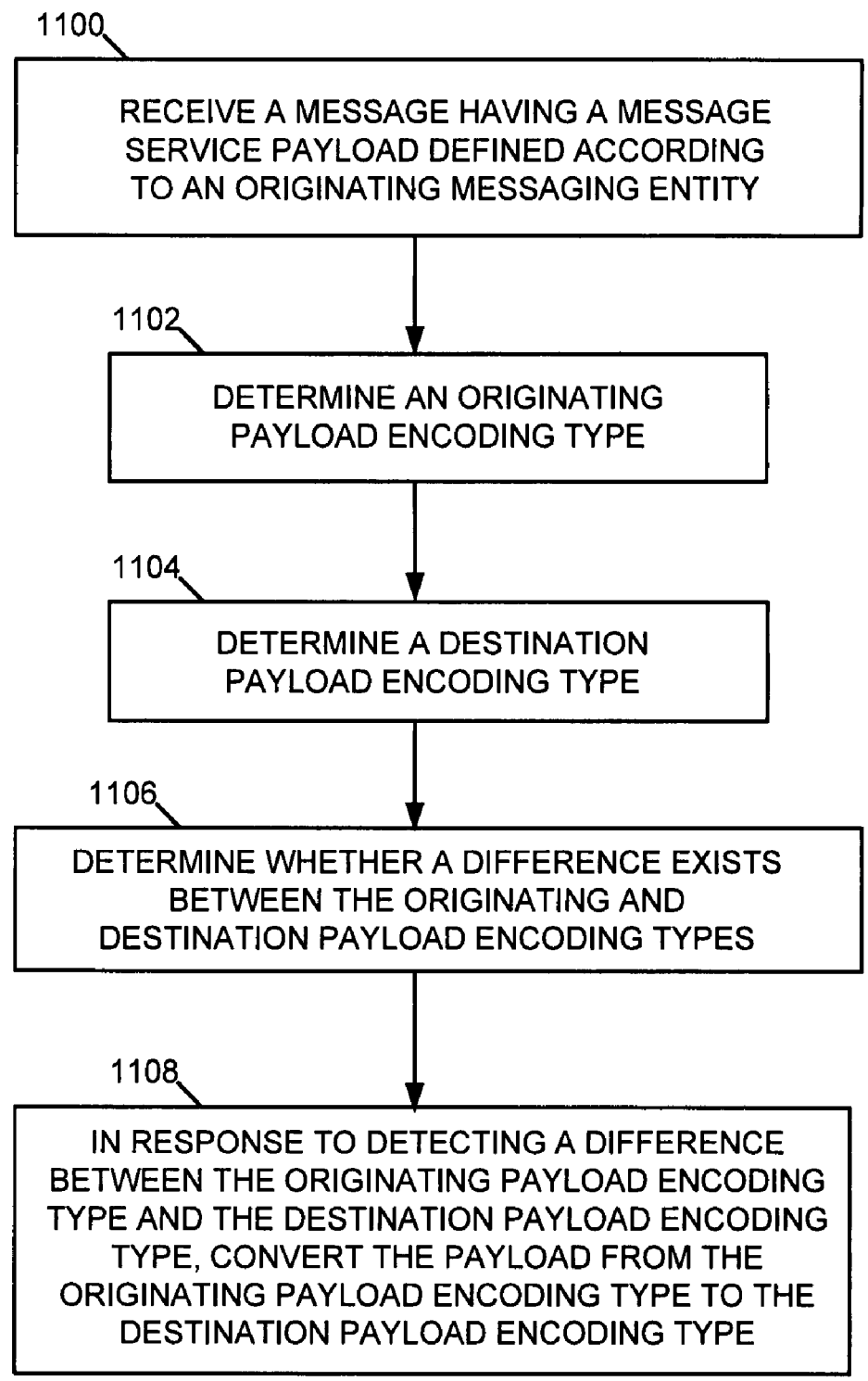
FIG. 11 is a flow chart of an exemplary process for converting the format of a message service payload transmitted between different generation messaging entities according to an embodiment of the subject matter described herein.

FIG. 11 is a flow chart of an exemplary process for converting the format of a message service payload transmitted between different generation destinations according to an embodiment of the subject matter described herein. For example, a message service message originating at a 2G mobile terminal encoded using the IS-637 binary format may be converted to a 3G-compatible format, such as a SIP-encoded MIME or text format, before delivery to destination a 3G SIP mobile terminal. This transcoding conversion may be provided in a core network message server in addition to other message processing functions that may be required for message transfer and/or delivery. In FIG. 11, at block 1100, a network message server receives a message having a message service payload defined according to an originating terminal. For example, originating message server 114 may receive a plaintext message in a SIP message frame originating at 3G terminal 128 and destined for 2G terminal 104. In a second exemplary application, originating server 114 may receive an IS-637-encoded message in a SIP message frame originating at 2G terminal 104 and destined for 3G terminal 128.

At block 1102, the network message server detects an originating payload encoding type. For example, originating message server 114 may receive and process a SIP message frame comprising a message service message and may detect that the originating payload encoding type is SIP-encoded text by examining the content type field 314 and the payload identifier 316. In a second exemplary application, originating message server 114 may receive and process an extended SIP message frame comprising an IS-637 message service message and may detect that the originating payload encoding type is IS-637.

At block 1104, the network message server detects a destination payload encoding type. For example, network message server 114 may forward the destination identifier for the message service message to presence server 126, to an HSS, or to an ENUM server, in order to determine the destination terminal type and associated message service message format.

At block 1106, the network message server determines whether a difference exists between the originating and destination payload encoding types. For example, network message server 114 may determine that the originating terminal encodes message service message payload using a SIP-encoded text format while the destination terminal expects to receive an IS-637 message service message payload.

At block 1108, in response to detecting a difference between the originating payload encoding type and the destination payload encoding type, the network message server converts the payload from the originating payload encoding type to the destination payload encoding type. For example, the network message server receiving a message service message from a 3G terminal 128 destined for a 2G terminal 104 may detect a difference in message encoding formats and, in response, may pass the SIP-encoded text message received from 3G terminal 128 through transcoder 500 to generate an IS-637 message service message that may be properly delivered to 2G terminal 104. In another exemplary application, the network message server receiving a message service message from a 2G terminal 104 destined for a 3G terminal 128 may detect a difference in message encoding formats and, in response, may pass the IS-637-encoded message block received from 2G terminal 104 through message transcoder 148 to generate a SIP-encoded version of the message service message to be delivered to 3G terminal 128.

Figure 12:
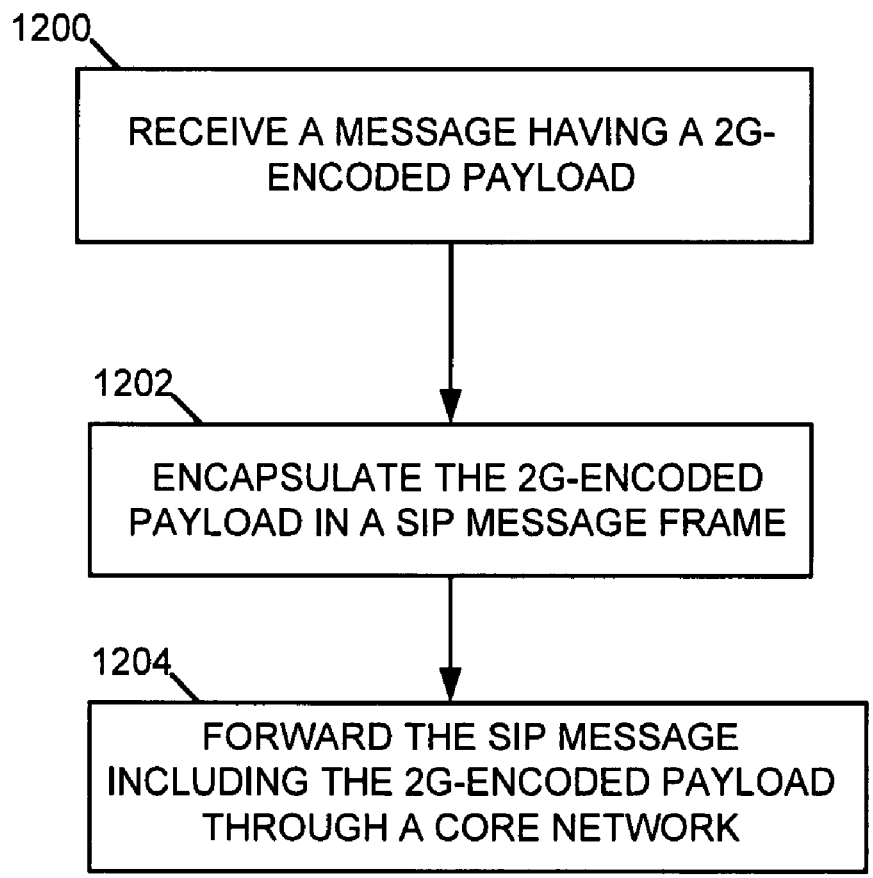
FIG. 12 is a flow chart of an exemplary process for tunneling an IS-637 short message service payload through a SIP core network according to an embodiment of the subject matter described herein.

FIG. 12 is a flow chart of an exemplary process for tunneling a 2G-encoded short message service message payload through a SIP core network according to an embodiment of the subject matter described herein. For example, a message service message originating at 2G mobile terminal 104 encoded using the IS-637 binary format may be destined for a remote 2G mobile terminal 402 that can only be reached by traversing core SIP/IMS network 124. The SIP/IMS network may be required to carry the IS-637-encoded message service message unchanged in a virtual tunnel. In FIG. 12, at block 1200 an originating message server receives a message having a 2G-encoded payload. For example, 2G SMG 110 or originating message server 114 may receive a message service message encoded in IS-637 format from 2G terminal 104.

At block 1202, the originating node encapsulates the IS-637 payload in a SIP message frame. For example, an extended SIP frame 300 may be constructed at short message gateway 110 or message server 114. The message may include a request line 302, message header 304, and message body 306 described above with respect to FIG. 3. Request line 302 may include a message type indication for the message service message and the SIP destination address for a terminating short message gateway 404 hosting destination 2G mobile terminal 402. Message header block 304 may comprise a plurality of general message routing data fields, including the SIP origination address for originating short message gateway 110, the SIP address for terminating short message gateway 118, a message sequence number, and/or other suitable parameters for message processing and transfer across a SIP network. Message body 306 may comprise a CPIM header block 308, including data fields with processing information for payload block 310 and/or a SIP origination node identifier, and a payload block 310, including content length field 312, content type field 314, payload identifier 316, and payload 318. Content length field 312 may identify the total number of bytes in the message block, while content type field 314 may include "MIME binary" and payload identifier 316 may include "IS-637". Message block 318 may include the IS-637-encoded message block received from originating 2G terminal 104.

At block 1204, the originating message server forwards the SIP message including the 2G-encoded payload through a core network. For example, originating message gateway 110 may forward the extended SIP frame created at block 1202 to terminating short message gateway 404. Terminating message gateway 404 may remove the IS-637 payload from the extended SIP frame and forward the IS-637 payload to terminating 2G mobile device 402 through terminating mobile switching center 406 and terminating base station controller 408. In another exemplary application, originating short message gateway 110 may forward the extended SIP frame comprising the IS-637 payload to originating message server 114. In response to receipt of the extended SIP frame, message server 114 may decode the IS-637 payload and may provide a service indicated in the payload, such as alert or delivery for the message. Originating message server 114 may encapsulate the IS-637 payload in another extended SIP message frame and forward the message frame to terminating short message gateway 404. Terminating short message gateway 404 may remove the IS-637 payload from the extended SIP frame and forward the IS-637 payload to terminating 2G mobile device 402 as described above.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for intelligently processing a messaging service message payload being transmitted between messaging entities, the method comprising:
at a core network element:
(a) receiving a SIP message having a messaging service message payload, the message being transmitted from an N-generation messaging entity to an M-generation messaging entity, N and M being integers, wherein the messaging service message payload comprises one of a short message service (SMS) message or a multimedia messaging service (MMS) message;
(b) decoding the payload of the message to identify a service to be provided; and
(c) performing an action to facilitate providing of the identified service, wherein performing an action to facilitate providing of the identified service includes converting the SMS message or the MMS message from a payload encoding type compatible with the N-generation messaging entity to a payload encoding type compatible with the M-generation messaging entity.

2. The method of claim 1 wherein N and M are different.

3. The method of claim 1 wherein N and M are equal.

4. The method of claim 3 wherein N and M are equal to three, wherein the M-generation terminal is IS-637 compatible, and wherein performing an action to facilitate providing of the service includes encoding the payload in IS-637 format and wherein the method further comprises delivering the payload to the M-generation messaging entity in IS-637 format.

5. The method of claim 3 wherein N and M are equal to 3, wherein the N- and M-generation messaging entities use different 3G payload encoding formats, and wherein performing an action to facilitate the providing of the service includes encoding the payload in IS-637 format for transmission through the core network and wherein the method further comprises converting the payload encoding format from IS-637 to the 3G encoding format of the M-generation messaging entity and delivering the payload to the M-generation messaging entity in its 3G encoding format.

6. The method of claim 1 wherein the payload comprises a GSM-encoded payload and wherein decoding the payload includes decoding the GSM-encoded payload.

7. The method of claim 1 comprising tunneling the payload through a SIP network for delivery to the M-generation messaging entity.

8. The method of claim 7 wherein tunneling the payload through a SIP network includes tunneling an IS-637-encoded payload through the SIP network.

9. The method of claim 7 wherein tunneling the payload through a SIP network includes tunneling a GSM-encoded payload through the SIP network.

10. The method of claim 1 wherein the identified service comprises one of an alert on delivery service and a content-based billing service.

11. A method for converting the format of a messaging service message payload transmitted between different generation destinations, the method comprising:
(a) receiving a SIP message having a messaging service message payload defined according to an originating messaging entity, wherein the messaging service message payload comprises one of a short message service (SMS) message or a multimedia messaging service (MMS) message;
(b) determining an originating payload encoding type;
(c) determining a destination payload encoding type;
(d) determining whether a difference exists between the originating and destination payload encoding types; and
(e) in response to detecting a difference between the originating payload encoding type and the destination payload encoding type, converting the payload from the originating payload encoding type to the destination payload encoding type, wherein converting the payload from the originating payload encoding type to the destination payload encoding type includes converting the SMS message or the MMS message from the originating payload encoding type to the destination payload encoding type.

12. The method of claim 11 wherein the originating payload encoding type is defined to be IS-637 and the destination payload encoding type is defined to be SIP-encoded text.

13. The method of claim 11 wherein the originating payload encoding type is defined to be SIP-encoded text and the destination payload encoding type is defined to be IS-637.

14. The method of claim 11 wherein the originating payload encoding type is defined to be GSM and the destination payload encoding type is defined to be SIP-encoded text.

15. The method of claim 11 wherein the originating payload encoding type is defined to be SIP-encoded text and the destination payload encoding type is defined to be GSM.

16. The method of claim 11 wherein determining a destination payload encoding type comprises querying one of a presence server, an E.164 number mapping (ENUM) server, and a home subscriber server (HSS) to determine the destination payload encoding type.

17. A method for tunneling a 2G-encoded short message service (SMS) message payload through a SIP core network, the method comprising:
(a) receiving a message having a 2G-encoded SMS message payload;
(b) encapsulating the 2G-encoded SMS message payload in an SIP message frame; and
(c) forwarding the SIP message frame including the 2G-encoded SMS message payload through a core network.

18. The method of claim 17 wherein the 2G-encoded payload comprises an IS-637-encoded payload.

19. The method of claim 17 wherein the 2G-encoded payload comprises a GSM-encoded payload.

20. The method of claim 17 wherein the SIP core network includes an IP multimedia subsystem (IMS) network.

21. The method of claim 17 wherein the SIP message frame comprises an extended SIP message frame that includes a payload identifier field containing an indication that the payload is a 2G-encoded payload.

22. A system for intelligently processing a messaging service message payload being transmitted between different generation destinations, the system comprising:
(a) a messaging service message service selector operable to receive a message having a messaging service message payload, the message being transmitted from an N-generation messaging entity and being destined for an M-generation messaging entity, N and M being integers, and to decode the messaging service message payload to identify a service to be provided, wherein the messaging service message payload comprises one of a short message service (SMS) message or a multimedia messaging service (MMS) message; and (b) a messaging service message payload processor operable to perform an action to facilitate the providing of the service and to convert the SMS message or the MMS message from a payload encoding type compatible with the N-generation messaging entity to a payload encoding type compatible with the M-generation messaging entity.

23. The system of claim 22 wherein N and M are different.

24. The system of claim 22 wherein N and M are equal.

25. The system of claim 24 wherein N and M are equal to 3, wherein the M-generation messaging entity is IS-637 compatible, and wherein the messaging service message payload processor is adapted to encode the payload in IS-637 format to facilitate the providing of the service and to forward the IS-637-encoded payload to the M-generation messaging entity.

26. The system of claim 24 wherein N and M are equal to 3, wherein the M- and N-generation messaging entities use different 3G payload encoding formats, and wherein the messaging service message payload processor is adapted to encode the payload in IS-637 format for transmission through the core network and wherein the system further comprises a terminating messaging service message entity for converting the payload encoding format from IS-637 to the 3G encoding format of the M-generation messaging entity and for delivering the payload to the M-generation messaging entity in its 3G encoding format.

27. The system of claim 22 wherein the payload comprises a GSM-encoded payload and wherein the messaging service message service selector is adapted to decode the GSM-encoded payload.

28. The system of claim 27 comprising a messaging service message payload encoding type identifier for identifying a payload encoding type of the M-generation messaging entity and a messaging service message payload transcoder for converting a payload encoding type of the payload to the payload encoding type of the M-generation messaging entity.

29. The system of claim 28 wherein the messaging service message payload encoding type identifier is adapted to query one of a presence server, an E.164 number mapping (ENUM) server, and a home subscriber server (HSS) to determine the payload encoding type of the M-generation messaging entity.

30. The system of claim 22 comprising a messaging service message payload tunneling function for tunneling the payload through a SIP network.

31. The system of claim 30 wherein the messaging service message payload tunneling function is adapted to tunnel an IS-637 payload in the message through the SIP network.

32. The system of claim 31 wherein the messaging service message payload tunneling function is adapted to tunnel a GSM payload in the message through the SIP network.

33. The system of claim 22 wherein the messaging service message payload processor is adapted to facilitate the providing of one of a return receipt service and a content-based billing service.

34. A system for converting the format of a messaging service message payload transmitted between different generation destinations, the system comprising:
(a) a messaging service message payload encoding type identifier operable to:
(i) receive a SIP message having a messaging service message payload defined according to an originating messaging entity, wherein the messaging service message payload comprises one of a short message service (SMS) message or a multimedia messaging service (MMS) message;
(ii) determine an originating payload encoding type;
(iii) determine a destination payload encoding type; and
(iv) determine whether a difference exists between the originating and destination payload encoding types; and
(b) a message payload transcoder for, in response to the presence of a difference between the originating payload encoding type and the destination payload encoding type, converting the payload from the originating payload encoding type to the destination payload encoding type, wherein converting the payload from the originating payload encoding type to the destination payload encoding type includes converting the SMS message or the MMS message from the originating payload encoding type to the destination payload encoding type.

35. The system of claim 34 wherein the originating payload encoding type is defined to be IS-637 and the destination payload encoding type is defined to be SIP-encoded text.

36. The system of claim 34 wherein the originating payload encoding type is defined to be SIP-encoded text and the destination payload encoding type is defined to be IS-637.

37. The system of claim 34 wherein the originating payload encoding type is defined to be GSM-encoding and the destination payload encoding type is defined to be text.

38. The system of claim 34 wherein the originating payload encoding type is defined to be SIP-encoded text and the destination payload encoding type is defined to be GSM.

39. The system of claim 34 wherein the messaging service message payload encoding type identifier is adapted to query one of a presence server, an E.164 number mapping (ENUM) server, and a home subscriber server (HSS) to determine the payload encoding type of the destination.

40. A system for tunneling a 2G-encoded short message service (SMS) message payload through a SIP core network, the system comprising:
(a) a messaging service message service selector for receiving a message including a 2G-encoded SMS message payload; and
(b) a messaging service message tunneling function for receiving the message from the messaging service message service selector, for encapsulating the 2G-encoded SMS message payload in a SIP message frame and for forwarding the SIP message frame comprising the 2G-encoded SMS message payload through a core network.

41. The system of claim 40 wherein the 2G-encoded payload comprises an IS-637-encoded payload.

42. The system of claim 40 wherein the 2G-encoded payload comprises a GSM-encoded payload.

43. The system of claim 40 wherein the network comprises an IP multimedia subsystem (IMS) network.

44. The system of claim 40 wherein the SIP message comprises an extended SIP message frame and includes a payload identifier field containing an indication that the payload is a 2G-encoded payload.

45. A computer program product comprising computer executable instructions embodied in a non-transitory computer readable medium for performing steps comprising:
at a core network element:
(a) receiving a SIP message having a messaging service message payload, the message being transmitted from an N-generation messaging entity to an M-generation messaging entity, N and M being integers, wherein the messaging service message payload comprises one of a short message service (SMS) message or a multimedia messaging service (MMS) message;
(b) decoding the payload of the message to identify a service to be provided; and (c) encoding the payload of the message in a format to facilitate the providing of the identified service, wherein encoding the payload of the message in the format to facilitate the providing of the identified service includes converting the SMS message or the MMS message from a payload encoding type compatible with the N-generation messaging entity to a payload encoding type compatible with the M-generation messaging entity.

46. A computer program product comprising computer executable instructions embodied in a non-transitory computer readable medium for performing steps comprising:
- (a) receiving a SIP message having a messaging service message payload defined according to an originating messaging entity, wherein the messaging service message payload comprises one of a short message service (SMS) message or a multimedia messaging service (MMS) message;
- (b) determining an originating payload encoding type;
- (c) determining a destination payload encoding type;
- (d) determining whether a difference exists between the originating and destination payload encoding types; and
- (e) in response to detecting a difference exists between the originating payload encoding type and the destination payload encoding type, converting the payload from the originating payload encoding type to the destination payload encoding type, wherein converting the payload from the originating payload encoding type to the destination payload encoding type includes converting the SMS message or the MMS message from the originating payload encoding type to the destination payload encoding type.

47. A computer program product comprising computer executable instructions embodied in a non-transitory computer readable medium for performing steps comprising:
- (a) receiving a message including a 2G-encoded short message service (SMS) message payload;
- (b) encapsulating the 2G-encoded SMS message payload in a SIP message frame; and
- (c) forwarding the SIP message frame including the 2G-encoded SMS message payload through a core network.

* * * * *